(12) United States Patent
Uchida

(10) Patent No.: US 9,720,633 B2
(45) Date of Patent: Aug. 1, 2017

(54) IMAGE FORMING APPARATUS, IMAGE FORMING SYSTEM, IMAGE PROCESSING METHOD, AND COMPUTER-READABLE RECORDING MEDIUM

(71) Applicant: KONICA MINOLTA, INC., Chiyoda-ku, Tokyo (JP)

(72) Inventor: Yuji Uchida, Tachikawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/133,971

(22) Filed: Apr. 20, 2016

(65) Prior Publication Data

US 2016/0335035 A1 Nov. 17, 2016

(30) Foreign Application Priority Data

May 15, 2015 (JP) .................................. 2015-100435

(51) Int. Cl.
*H04N 1/04* (2006.01)
*G06F 3/12* (2006.01)
*G06K 15/02* (2006.01)

(52) U.S. Cl.
CPC .......... *G06F 3/1211* (2013.01); *G06F 3/1244* (2013.01); *G06F 3/1254* (2013.01); *G06F 3/1282* (2013.01); *G06F 3/1295* (2013.01); *G06F 3/1296* (2013.01); *G06K 15/022* (2013.01); *G06K 15/1809* (2013.01); *G06K 15/1817* (2013.01)

(58) Field of Classification Search
CPC .... G06F 3/1211; G06F 3/1254; G06F 3/1296; G06F 3/1295; G06F 3/1244; G06F 3/1282

USPC .............................. 358/1.13, 1.14, 1.15, 1.9
See application file for complete search history.

(56) References Cited

U.S. PATENT DOCUMENTS

| 6,542,253 | B1* | 4/2003 | Kim ..................... G06F 3/1293 358/1.15 |
| 7,233,410 | B2* | 6/2007 | Sekiguchi .......... H04N 1/00347 358/1.15 |
| 7,593,128 | B2 | 9/2009 | Sekiguchi et al. |
| 8,111,420 | B2 | 2/2012 | Sekiguchi et al. |
| 2005/0264832 | A1 | 12/2005 | Baum et al. |

FOREIGN PATENT DOCUMENTS

JP 4895148 B2 3/2012

OTHER PUBLICATIONS

Extended European Search Report dated Oct. 10, 2016, issued in counterpart European Application No. 16166292.9.

* cited by examiner

*Primary Examiner* — Houshang Safaipour
(74) *Attorney, Agent, or Firm* — Holtz, Holtz & Volek PC

(57) ABSTRACT

An image forming apparatus according to the present invention performs image processing on image data in units of pages stored in a page memory on the basis of parameter setting, transferring the image data to a buffer at a first speed, transmitting the image data, which is read out from the buffer at a second speed, to an image forming unit, and executing parameter setting for image processing performed when image data for a subsequent page is transferred after the image data for a single page has been transferred but before image data for the subsequent page is started to be transferred, wherein the first speed is faster than a second speed.

20 Claims, 18 Drawing Sheets

FIG.5A

| TRANSFER PROCESSING TIME | FIRST PAGE | | | | SECOND PAGE | | | |
|---|---|---|---|---|---|---|---|---|
| | Y | M | C | K | Y | M | C | K |
| t10 | on | on | on | on | off | off | off | off |
| t20 | on | on | on | on | off | off | off | off |
| t30 | on | on | on | on | off | off | off | off |
| t40 | on | on | on | on | off | off | off | off |
| t50 | off | off | off | off | off | off | off | off |
| t60 | off | off | off | off | on | on | on | on |
| t70 | off | off | off | off | on | on | on | on |
| t80 | off | off | off | off | on | on | on | on |

FIG.5B

| READ OUT PROCESSING TIME | FIRST PAGE | | | | SECOND PAGE | | | |
|---|---|---|---|---|---|---|---|---|
| | Y | M | C | K | Y | M | C | K |
| t10 | on | off | off | off | off | off | off | off |
| t20 | on | on | off | off | off | off | off | off |
| t30 | on | on | on | off | off | off | off | off |
| t40 | on | on | on | on | off | off | off | off |
| t50 | off | on | on | on | off | off | off | off |
| t60 | off | off | on | on | on | off | off | off |
| t70 | off | off | off | on | on | on | off | off |
| t80 | off | off | off | off | on | on | on | off |

FIG.6A

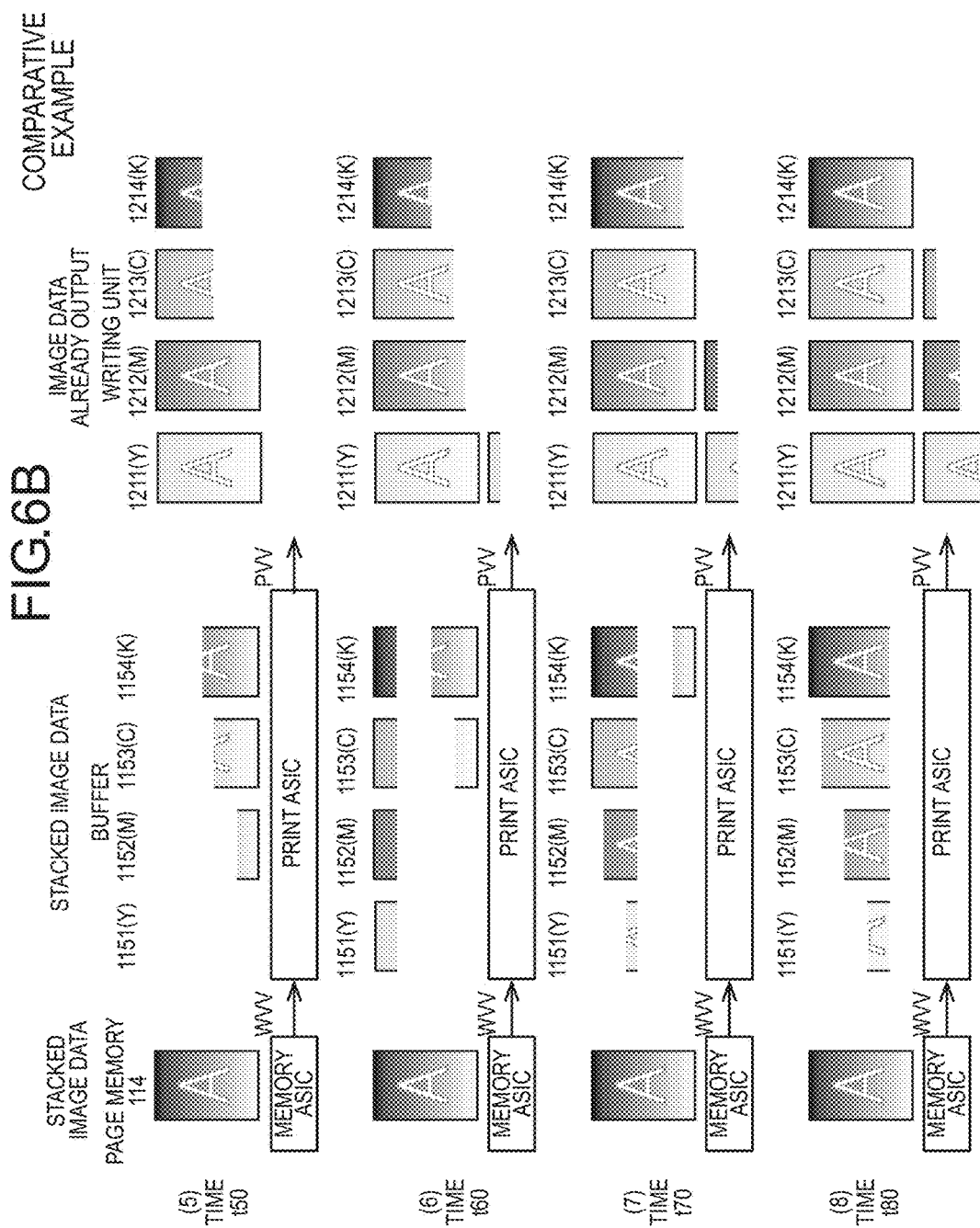

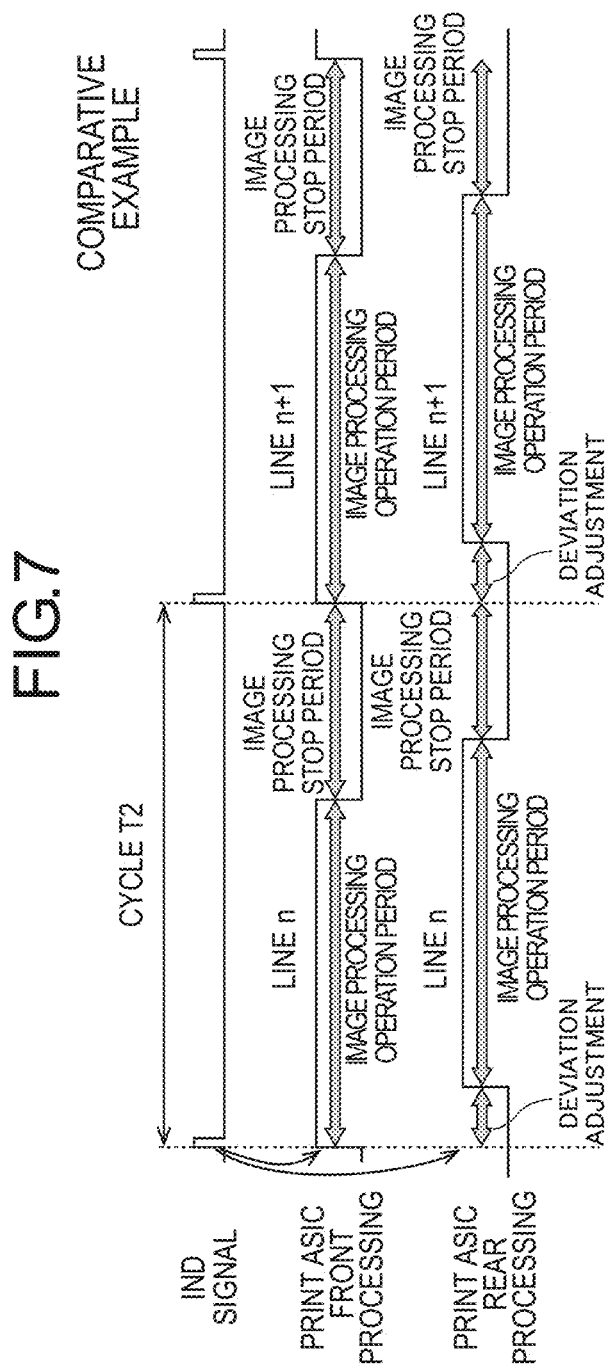

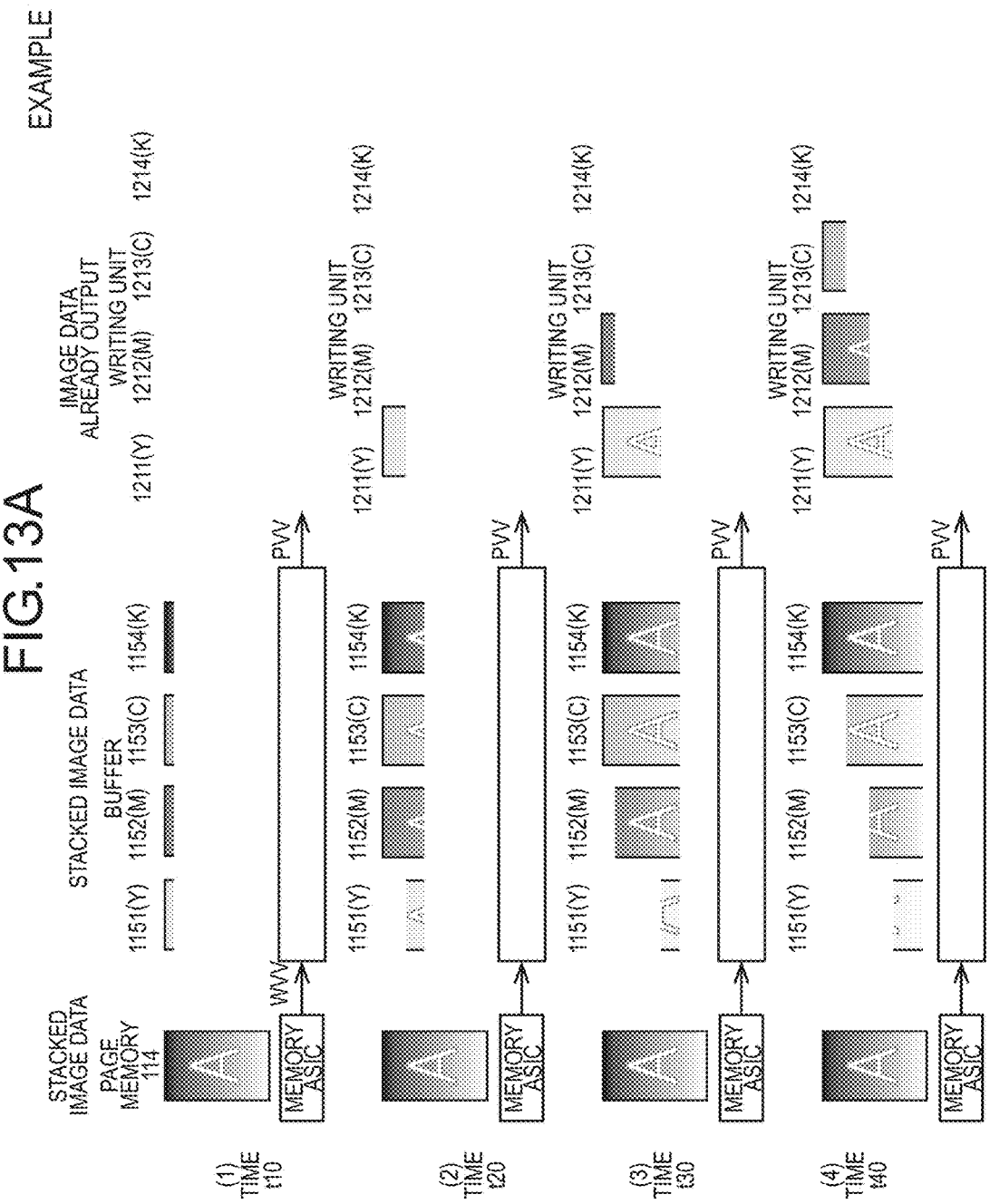

IMAGE FORMING APPARATUS, IMAGE FORMING SYSTEM, IMAGE PROCESSING METHOD, AND COMPUTER-READABLE RECORDING MEDIUM

CROSS-REFERENCE TO RELATED APPLICATION

This application is based on Japanese Patent Application No. 2015-100435 filed on May 15, 2015, the contents of which are incorporated herein by reference.

BACKGROUND

Technical Field

The present invention relates to an image forming apparatus, an image forming system, and an image processing method.

Description of Related Arts

With an image forming apparatus for forming an image, when images are formed on sheets on the basis of image data in units of pages, the image data in units of pages are stacked in a page memory, and various kinds of image processing is applied to the stacked image data in accordance with a processing speed of a printer, and then the processed image data is transmitted to the printer. At this occasion, it is necessary to maintain consistency of the processing speed between the transfer of the image data to the page memory and the reading process from the page memory.

In the technique disclosed in Patent Literature 1 (Japanese Patent No. 4895148), in a configuration in which multiple scanners and multiple printers are connectable to a controller in any given combination, the controller is provided with a page memory in order to absorb the difference of the process speed between them both when the printer prints image data of an original document read by the scanner. Then, in a case where the process speed of the connected printer is higher than the process speed of the scanner, the controller performs the following delay control so as not to exhaust the image data in the page memory before finishing the writing of the image data for a single original document sheet. When the image data is started to be transmitted to the printer from the page memory before finish of writing to the page memory of the image data read by the scanner, the controller determines timing for starting transmission of the image data from the page memory to the printer on the basis of the difference of the process speed between the scanner and the printer and the size of the image data.

As another technique, the image forming apparatuses include an apparatus that supports not only a cut sheet such as an A4 size but also a continuous sheet such as a roll sheet. The continuous sheet has, for example, a width of several dozen millimeters and a length of several hundred meters or several kilometers in the conveying direction.

Since the continuous sheet has a large sheet surface, multiple page images can be printed while the page images are continuously arranged in the conveying direction. At this occasion, a margin area which is an area between page images, i.e., a space between images, is a useless area, and it is necessary to, e.g., discard the margin area after it is cut in the post processing performed after the printing. Therefore, the image interval is preferably made to be as narrow as possible.

It is necessary to execute image processing on each of the page images with hardware supporting applied functions such as stamps and characteristics of the image forming unit. The parameter of the image processing is set to a different value for each page image. Therefore, it is necessary to perform the setting processing at a time between images where a page is switched. In a case where a cut sheet is used, it is necessary to make a space between sheets in order to convey each of the sheets, and in general, the sheet interval is about 30 to 50 mm. In this case, the processing of the parameter setting for a subsequent page image performed between pages can be processed within a period of time allocated in the sheet interval (image interval). On the other hand, in a case where a continuous sheet is used, it is not preferable to provide an image interval of 30 to 50 mm from the view point of reduction of the margin area, and it is preferable to set an image interval of about several millimeters to about 1 mm.

However, when the image interval is set to about 1 mm, the processing of the parameter setting performed between images for each page image cannot be done in time, and this processing becomes a bottleneck, which makes it impossible to sufficiently reduce the image interval. In the technique disclosed in Patent literature 1, the timing for starting transmission from the page memory to the printer is adjusted, and this can prevent the image data from being exhausted during transmission from the page memory to the printer, but the technique disclosed in Patent literature 1 cannot solve the problem to more greatly reduce the image interval.

The present invention is made in view of the above circumstances, and it is an object of the present invention to provide an image forming apparatus that can ensure a processing time for parameter setting performed between images even when an image interval is set to be shorter, e.g., even when a continuous sheet is used, and therefore, the image forming apparatus can appropriately perform image processing on image data in units of pages.

SUMMARY

To achieve at least one of the abovementioned objects, an image forming apparatus reflecting one aspect of the present invention is an image forming apparatus for forming an image on a sheet on the basis of image data in units of pages. The image forming apparatus includes:

a page memory storing the image data in units of pages;

a buffer temporarily storing the image data transferred from the page memory at a first speed;

an image forming unit forming an image on the basis of the image data read out from the buffer at a second speed; and an image control circuit controlling operation of the transfer and the read out, performing parameter setting for each page, and performing image processing on the image data on the basis of the parameter setting, wherein the first speed is faster than the second speed, and after the image data for a single page has been transferred from the page memory to the buffer but before image data for a subsequent page is started to be transferred, the image control circuit executes the parameter setting for the image data for the subsequent page.

BRIEF DESCRIPTION OF THE DRAWINGS

FIG. 5A is a figure for explaining situation of transfer (input) to a buffer 115 at times t10 to t80 in FIG. 4.

FIG. 5B is a figure for explaining situation of read (output) from the buffer 115 at the times t10 to t80 in FIG. 4.

FIG. 6A is a schematic diagram illustrating accumulation situation of image data in the page memory 114 and the buffer 115 at the times t10 to t40 in FIG. 4.

FIG. 6B is a schematic diagram illustrating accumulation situation of image data in the page memory 114 and the buffer 115 at the times t50 to t80 in FIG. 4.

FIG. 7 is a figure for explaining operation of a print ASIC 202 in response to an IND signal.

FIG. 13A is a schematic diagram illustrating accumulation situation of image data in the page memory 114 and the buffer 115 at times t10 to t40 of FIG. 10.

DETAILED DESCRIPTION

Figure 1:
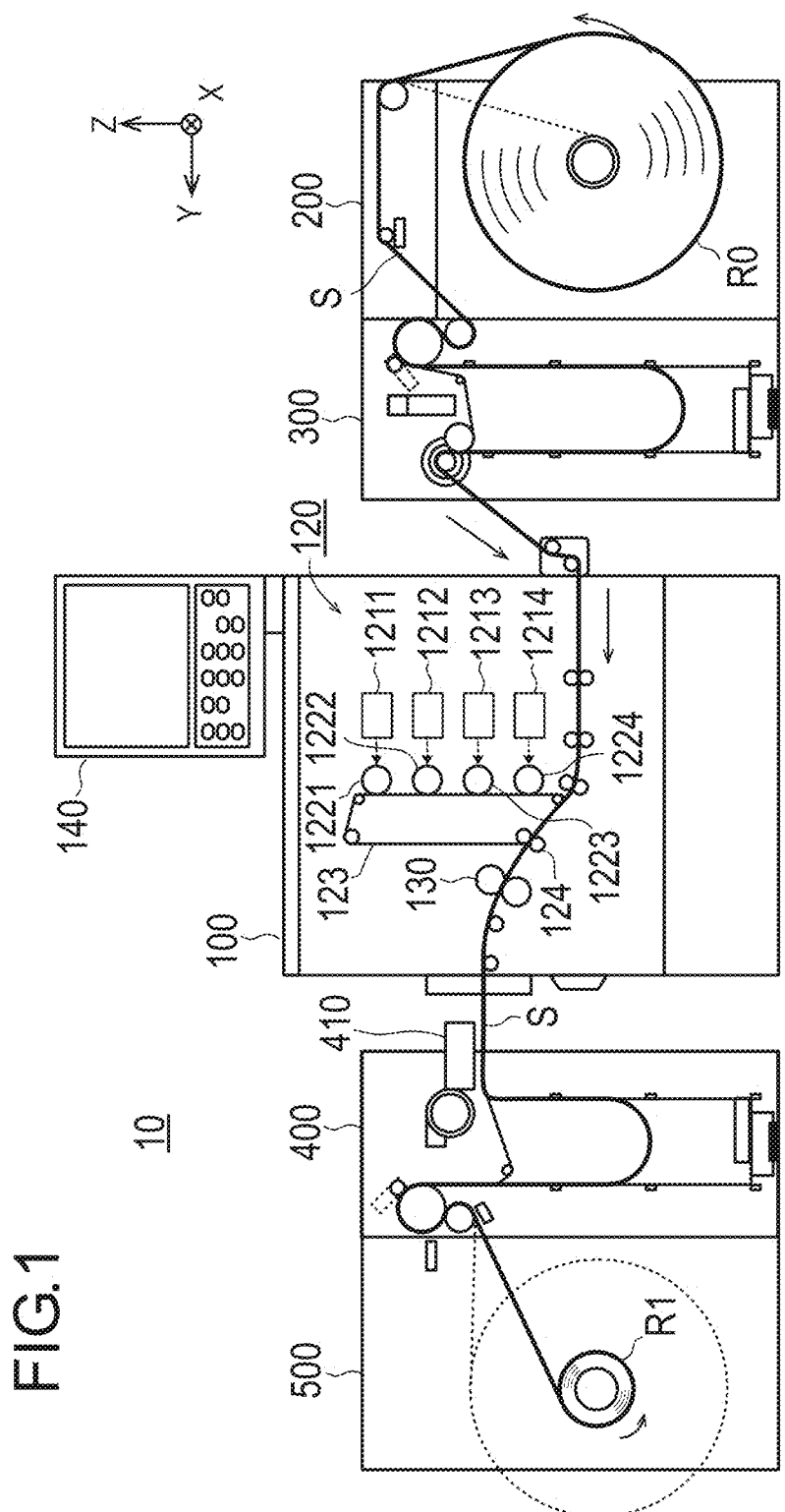
FIG. 1 is an outline drawing illustrating a configuration of an image forming system 10 according to an embodiment of the present invention.

An embodiment of the present invention will be hereinafter explained with reference to appended drawings. In the explanation about the drawings, the same constituent elements are denoted with the same reference symbols, and repeated explanation thereabout is omitted. The ratios of the dimensions in the drawings are exaggerated for the sake of explanation, and may be different from the actual ratios.

FIG. 1 is an outline drawing illustrating a configuration of an image forming system 10 according to an embodiment of the present invention. The image forming system 10 includes an image forming apparatus 100, a sheet feeding apparatus 200, a sheet feeding adjustment apparatus 300, a sheet discharge adjustment apparatus 400, and a reel apparatus 500.

The sheet feeding apparatus 200 stores and holds a roll R0 which is an original reel of a roll sheet serving as a continuous sheet, and feeds a continuous sheet S to the downstream side in the sheet conveying direction.

The sheet feeding adjustment apparatus 300 has a buffer function for absorbing a very small difference in the sheet conveying speed between the sheet feeding apparatus 200 and the image forming apparatus 100 and absorbing deviation of sheets.

The image forming apparatus 100 includes an image forming unit 120 forming an image according to well-known electrophotographic process using toner, a fixing unit 130, and a scanner 170, which are provided in the main body. The image forming unit 120 includes writing units 1211 to 1214, photosensitive drums 1221 to 1224, and developing apparatuses (not shown), which correspond to the colors of Y, M, C, K, respectively, and includes an intermediate transfer belt 123, and the like. The photosensitive drum 1221 is exposed at an exposure position with laser emitted from the writing unit 1211 (indicated by an arrow in FIG. 1). An electrostatic latent image formed on the surface of the photosensitive drum 1221 with the exposure is developed with toner by the developing apparatus for the color Y provided in a corresponding manner, and a toner image in the color Y is formed on the surface of the photosensitive drum 1221. Likewise, with the other photosensitive drums 1222 to 1224, the corresponding writing units 1212 to 1214 form electrostatic latent images, and the electrostatic latent images are developed with toner by the developing apparatuses for the colors M, C, and K provided in a corresponding manner, and the toner images in the colors M, C, and K are formed on the surfaces of the photosensitive drums 1222 to 1224. The formed toner image in each of the colors is primarily transferred onto the intermediate transfer belt 123 to be overlapped on each other, so that the toner images are made into a toner image in full color. This toner image in full color is transferred by the secondary transfer unit 124 onto a surface of the continuous sheet S fed from the sheet feeding apparatus 200, and thereafter, the toner image in full color is heated and pressurized by the fixing unit 130, so that the toner image in full color is fixed on the surface of the continuous sheet S.

The distance from the exposure position of each of the photosensitive drums 1221 to 1224 to the primary transfer position thereof is set to be the same. The distance between adjacent photosensitive drums in the Z direction (see FIG. 1) is the same, and the photosensitive drums 1221 to 1224 are arranged with an equal interval in the Z direction. Therefore, the relative distance of the exposure position of each of the photosensitive drums 1221 to 1224 is the same as the interval of the photosensitive drums (which may also be hereinafter simply referred to as "drum distance").

An operation display unit 140 is provided at an upper portion of the image forming apparatus 100. The operation display unit 140 receives user's operation, and displays information. The operation display unit 140 may be in any configuration, for example, a unit such as a touch panel in which an operation portion and a display portion are integrally configured, a configuration including hard keys such as buttons and keys and a liquid crystal display apparatus. The operation display unit 140 may be provided on the housing of the image forming apparatus 100 as shown in the drawing, or may be separated from the housing of the image forming apparatus 100.

Like the sheet feeding adjustment apparatus 300, the sheet discharge adjustment apparatus 400 also has a buffer function for absorbing a very small difference in the sheet conveying speed between the image forming apparatus 100 and the reel apparatus 500 and absorbing deviation of sheets. The sheet discharge adjustment apparatus 400 has a cutting device 410 for cutting the continuous sheet S, and can cut the continuous sheet S at a desired position in a width direction perpendicular to the conveying direction.

The continuous sheet S having passed through the sheet discharge adjustment apparatus 400 reaches the reel apparatus 500, and the continuous sheet S is wound and held by the roll R1.

In this embodiment, the roll sheet is used as the continuous sheet S, but the continuous sheet S is not limited to the roll sheet. Alternatively, the sheet may be continuous. For example, the sheet may be alternately folded. It should the material of the continuous sheet S is not limited to paper. Alternatively, the continuous sheet S may be made of a medium such as cloth. It should be noted that the continuous sheet S may be label paper obtained by adhering a label having adhesive agent applied to paper with release paper. In a case where the label paper is used, the cutting device 410 may cut out the label into the size corresponding to the image.

Figure 2:
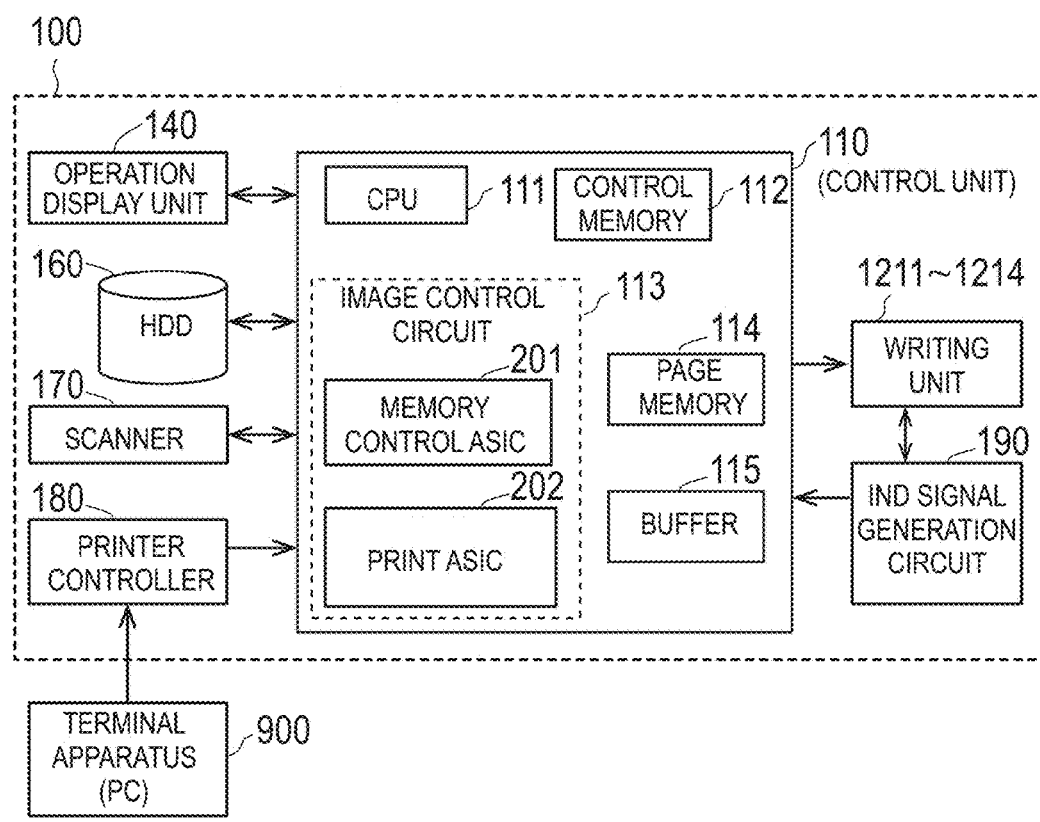
FIG. 2 is a block diagram illustrating a hardware configuration of an image forming apparatus 100.

FIG. 2 is a block diagram illustrating the hardware configuration of the image forming apparatus 100. The image forming apparatus 100 includes a control unit 110, an operation display unit 140, an HDD (hard disk drive) 160 which is a large capacity storage apparatus, a scanner 170 for reading an original document image, a printer controller 180, writing units 1211 to 1214, and an IND signal generation circuit 190 generating an index signal (hereinafter referred to as an "IND signal").

The control unit 110 includes a CPU 111, a control memory 112, an image control circuit 113, a page memory 114, and a buffer 115. The image control circuit 113 includes a memory control ASIC 201 (ASIC: Application Specific Integrated Circuit) and a print ASIC 202. The page memory 114 is connected to a memory control ASIC 201, and the memory control ASIC 201 controls input and output of data. The buffer 115 is connected to a print ASIC 202, and the print ASIC 202 controls input and output of data. It should be noted that the page memory 114 or the buffer 115 may be provided inside of the circuits of the memory control ASIC 201 and the print ASIC 202, respectively.

The CPU 111 centrally controls the entire operation of the image forming apparatus 100 and the image forming system 10 by executing various kinds of programs saved in the control memory 112 or the HDD 160.

Figure 3:
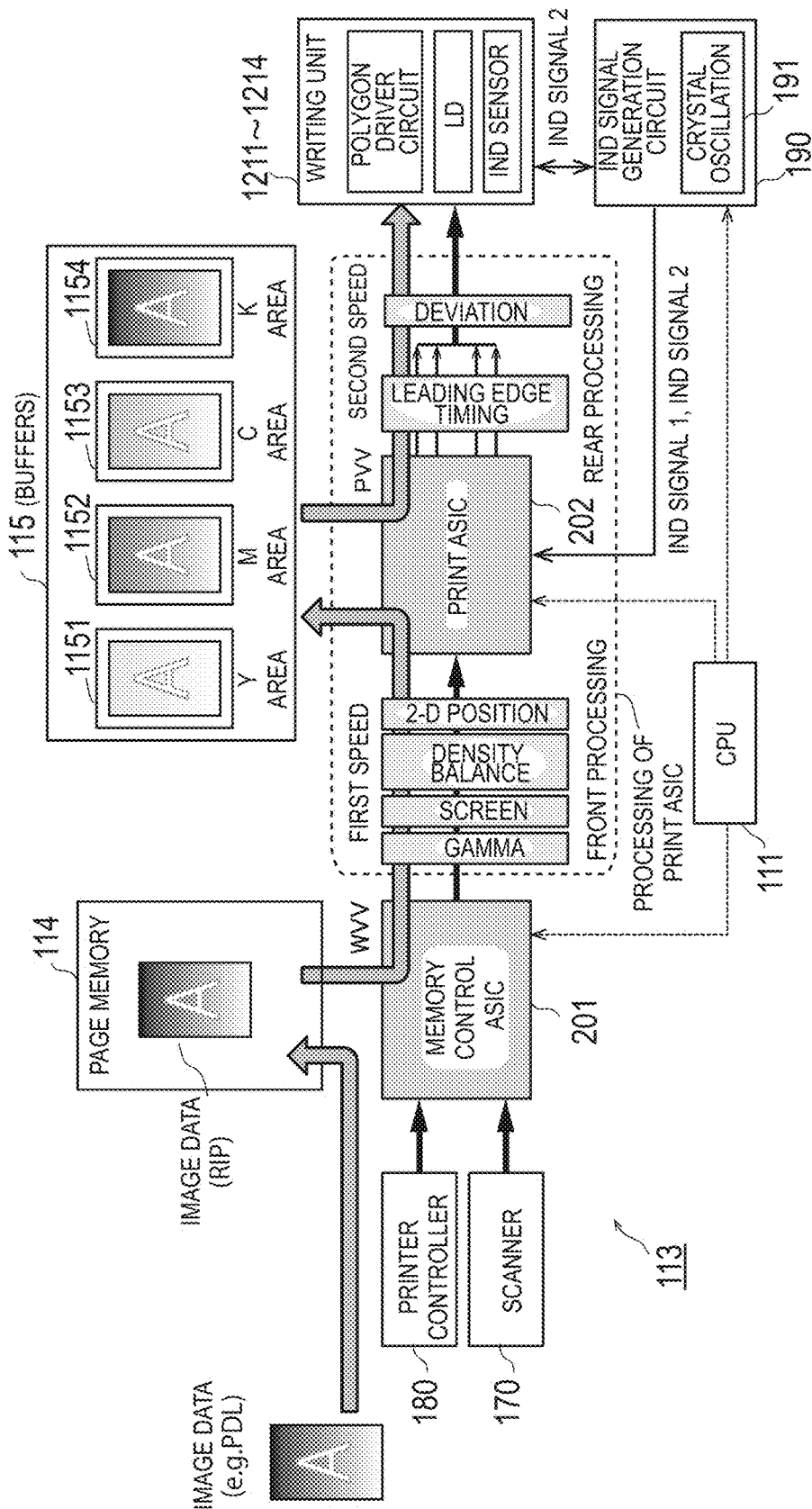
FIG. 3 is a schematic diagram for explaining functions of an image control circuit 113.

FIG. 3 is a schematic diagram for explaining the functions of the image control circuit 113. Hereinafter, the configuration of the image control circuit 113 and the processing of the image data will be explained with reference to FIG. 3. In the buffer 115, multiple buffers 1151 to 1154 are provided in association with multiple writing units 1211 to 1214, respectively, which correspond to multiple colors. The buffers 1151 to 1154 may be physically divided and independently configured, or the inside of a physically single buffer may be logically divided into multiple portions, and this may be used. The size of the buffer for each color may be configured to have the same capacity, or the sizes of the buffers may be configured to be different depending on the colors, e.g., the buffer 1154 for the color K of which usage capacity is the highest may be configured to have a larger capacity than the buffers 1151 to 1153 of the other colors.

Each of the writing units 1211 to 1214 includes an LD (laser diode), a polygon mirror, an index sensor, and a polygon driver circuit controlling a motor for driving the polygon mirror. The index sensor detects laser light reflected and emitted by the polygon mirror, and outputs a polygon rotation synchronization signal. The IND signal generation circuit 190 includes one or two crystal oscillation devices 191. The IND signal generation circuit generates an IND signal 1 and an IND signal 2. The IND signal 1 is used to control Front processing explained later. The IND signal 2 is used commonly to control Rear processing explained later and the rotation speed of the polygon motor. The IND signal 1 is used only for the Front processing, and therefore, as long as this cycle T1 is within the range of the upper and lower limits explained later, the cycle T1 can be freely set. On the other hand, the cycle T2 of the IND signal 2 is determined by the process speed (sheet conveying speed) and the sub-scanning rate of the image forming unit 120, and therefore, the cycle T2 of the IND signal 2 cannot be freely set. The phase of the IND signal 2 is synchronized and controlled on the basis of the polygon rotation synchronization signal that is output by the index sensor.

The cycle T1 of the IND signal 1 is set to a cycle shorter than the cycle T2 of the IND signal 2. The upper limit value of the cycle T1 of the IND signal 1 (the lower limit value of the transfer speed) is determined by a parameter setting time of the Front processing explained later, a sub-scanning length (the number of lines) of the image, and the image interval that has been set. On the other hand, the lower limit value (the upper limit value of the transfer speed) of the cycle T1 is determined by the ratio with the IND signal 2, the sub-scanning length of the image, the drum distance, and the capacity of the buffer 115. The details of the IND signal 1 will be explained later.

The printing image data described in the PDL format (PDL: Page Description Language) or the PDF format transmitted from the terminal apparatus 900 composed of a PC (personal computer) and the like are processed in rasterizing processing by the printer controller 180, converted into the image data in the raster format, and temporarily stored to the page memory 114.

During print output, the image data is transferred from the page memory 114 connected with the memory control ASIC 201 to the buffer 115 of the print ASIC 202 in such a manner that the image data is transferred for each line in order from the head of the image data on the basis of a WVV signal explained later. The image data for each line transferred from this page memory 114 is constituted by image data in four colors Y, M, C, and K. The image data is processed in the Front processing when the image data is transferred at a time for each line, and then, the image data is stored to each of the buffers 1151 to 1154 provided for each of the colors.

This Front processing includes image processing of gamma correction, screen correction, density balance, and two-dimensional position correction. In addition, in the parameter setting related to this Front processing, it is necessary to write setting data having a size of about several hundred kilobytes to the RAM area in the print ASIC 202 for each page. This setting data includes a look up table used for the Front processing and image data for composing a stamp image in which characters of, e.g., the page, the date, and the number of copies, are drawn. The parameter setting processing related to this Front processing processes a large amount of data, and therefore, it takes a long time to perform the parameter setting processing. For example, it takes 10 msec to perform this parameter setting processing, and in a case where the image interval is reduced, the time for executing the parameter setting processing may fail to be ensured between images according to conventional techniques.

The image data stored in the buffers 1151 to 1154 are read line by line from the buffers 1151 to 1154 on the basis of the PVV signal for each color explained later, and the image data are transmitted to the LDs of the corresponding writing units 1211 to 1214 (hereinafter simply referred to as "LDs"). When the image data are read out, the Rear processing of image position adjustment such as leading edge timing adjustment and deviation adjustment is applied to the image data of each line.

In the parameter setting related to this Rear processing, it is necessary to write setting data having a size of about several dozen bytes to the RAM area in the print ASIC 202 for each page. This setting data includes settings related to image positions. The parameter setting processing related to this Rear processing involves a small amount of data, and therefore, the parameter setting processing can be performed in a short time. For example, the parameter setting processing can be performed in a period of time of 3 msec or less. Some of the circuits related to the Rear processing are duplexed, and a setting of a subsequent page can be reserved, i.e., a setting of a subsequent page can be executed before the processing of the previous page is completed. Therefore, when the image interval is reduced, and only a short processing time can be ensured, the parameter setting processing related to the Rear processing can be executed.

(Image Output Processing with Cut Sheet (Comparative Example))

Figure 4:
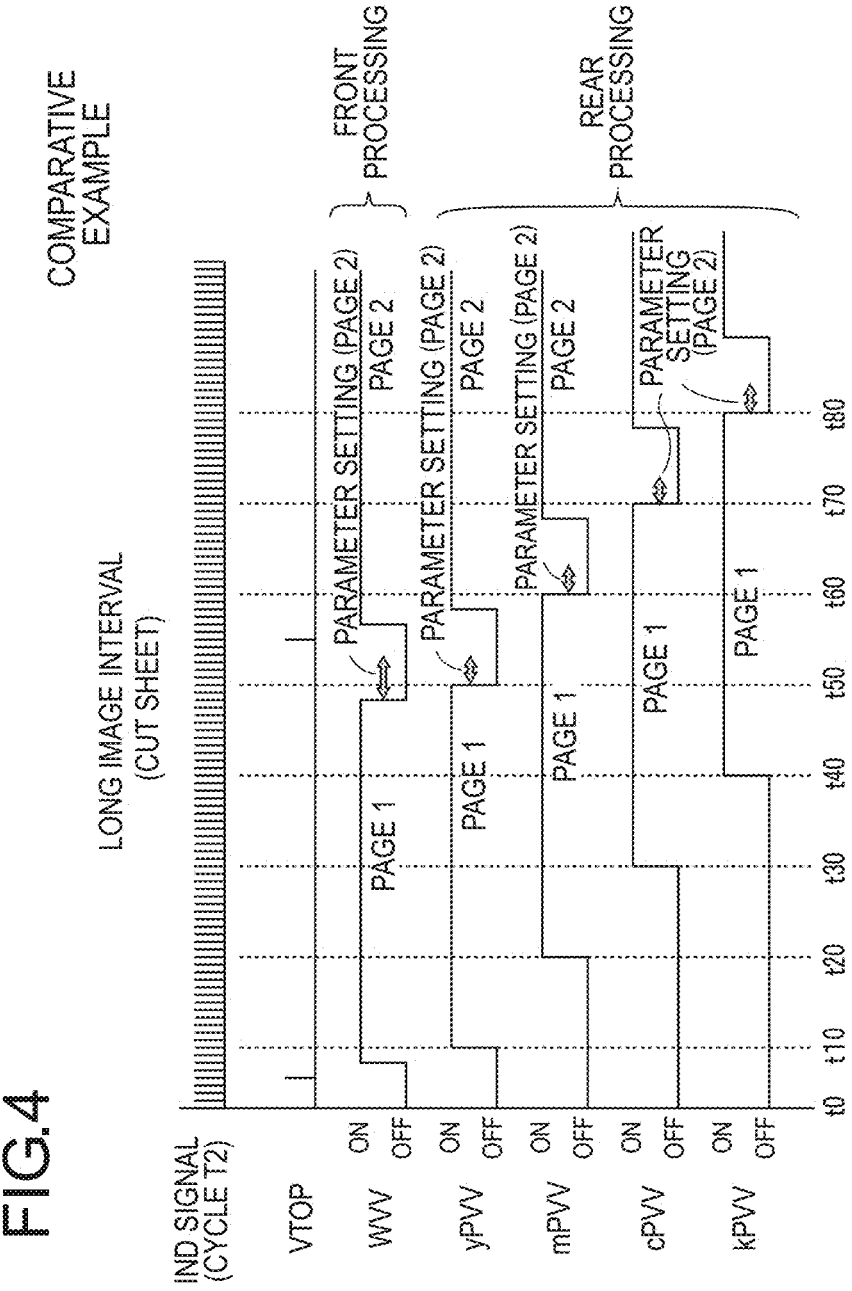
FIG. 4 is a timing chart during image output according to a comparative example.
Figure 6A:
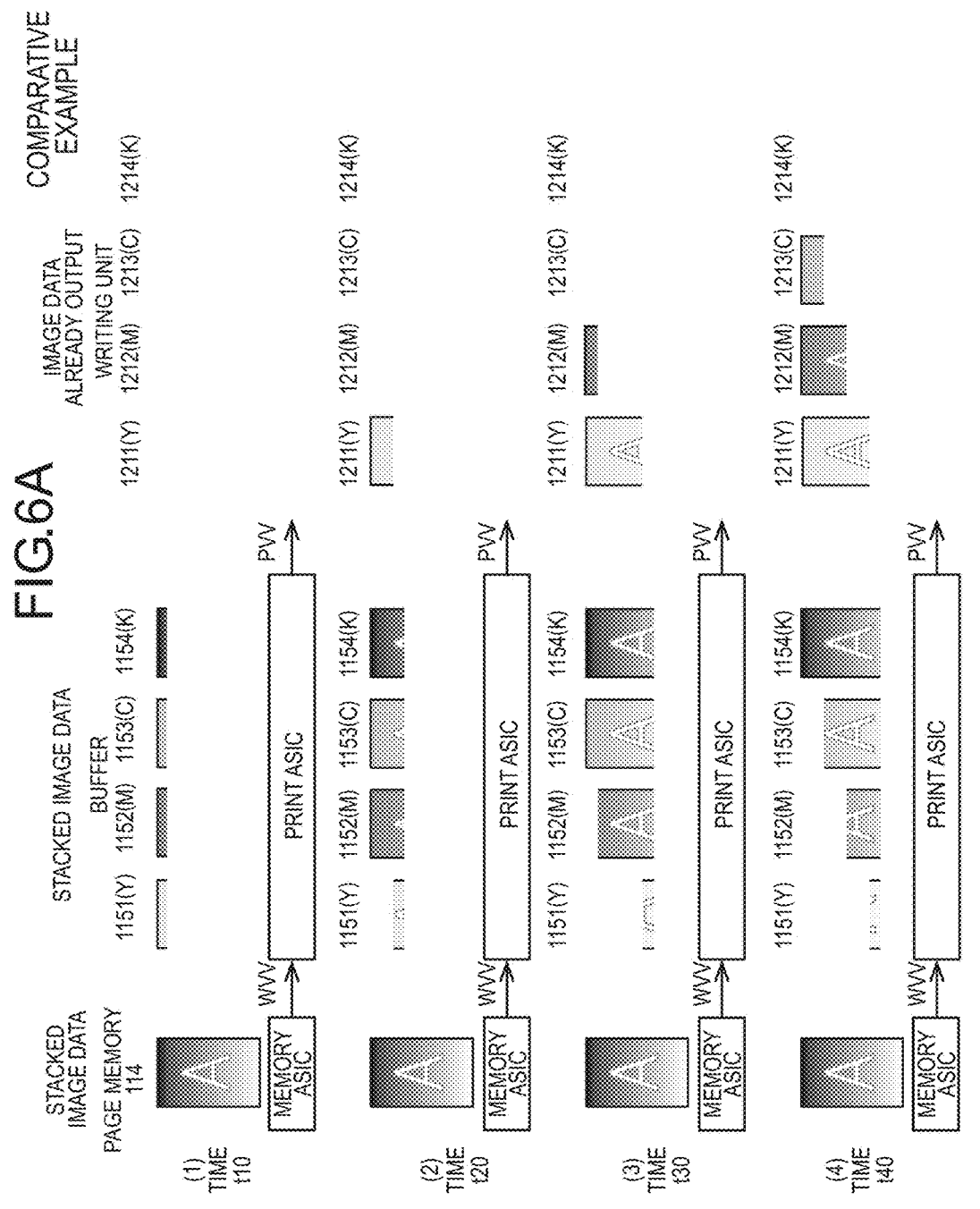

Next, image output from an image forming apparatus using a cut sheet according to a publicly known technique will be explained as a comparative example with reference to FIG. 4 to FIG. 7. In general, in a case where a cut sheet is used, an interval of about 30 to 50 mm is required to be at least provided between continuously conveyed sheets from the view point of timing of sheet feeding and skew control. In this case, a sufficient time can be ensured between sheets (between images) so that parameter setting processing can be executed on image data for a subsequent page. FIG. 4 is a timing chart during image output. FIG. 5A is a figure for explaining situation of transfer (input) processing to the buffer 115 at times t10 to t80 of the timing chart of FIG. 4. FIG. 5B is a figure for explaining situation of read out (output) processing. FIG. 6A and FIG. 6B are schematic diagrams illustrating accumulation situation of image data in the page memory 114 and the buffer 115 at times t10 to t80 of FIG. 4. FIG. 7 is a figure for explaining operation of the print ASIC 202 with respect to the IND signal.

In FIG. 4, the IND signal corresponds to the IND signal 2 explained above, and the cycle corresponds to the rotation speed of the polygon mirror. With an input of a single pulse, image data for a single line is processed. When an image forming apparatus has resolution of 400 to 600 dpi and a process speed of 300 to 400 mm/sec, the cycle of the IND signal is about 0.1 to 0.2 msec.

The WVV signal (W Vertical Valid) and the PVV signal (P Vertical Valid) as shown in FIG. 4 and FIG. 3 are signals for permitting operation of each of the Front circuit and the Rear circuit related to the Front processing and the Rear processing, respectively, of the print ASIC. These signals are turned ON after a predetermined period of time since reception of an image write start trigger signal VTOP of each page. Then, these signals are switched OFF upon receiving the IND signals for the number of lines of the image data after the signals are turned ON.

It is in the period in which the WVV signal is in the ON state that the image data for the first page is transferred from the page memory 114 to the buffer 115 and the Front processing is executed, and the length of this period is a length obtained by multiplying the number of lines of the image data for the first page by the cycle of the IND signal.

It is in the period in which the PVV signal is in the ON state that the image data for the first page is read out from the buffer 115 and the Rear processing is executed on the image data and the processed image data is transmitted to the LD. The length of this period is also a length obtained by multiplying the number of lines of the image data for the first page by the cycle of the IND signal. In the comparative example as shown in the drawing, the WVV signal and the PVV signal use a common IND signal. Therefore, in any given page, the period of time in which the WVV signal is in the ON state and the period of time in which the PVV signal is in the ON state are the same length. Likewise, the period of time in which the WVV signal is in the OFF state and the period of time in which the PVV signal is in the OFF state are the same length.

As shown in FIG. 4 and, FIG. 5A, the transfer of the image data to the buffer 115 is executed at a time for all the colors on the basis of the WVV signal. On the other hand, in the tandem type image forming apparatus as shown in FIG. 1, as many PVV signals as the number of colors are provided in order to absorb the physical distance (drum distance) of the photosensitive drum. The yPVV signal to the kPVV signal correspond to the colors Y to K, respectively. As shown in FIG. 4 and FIG. 5B, the read out of the image data from the buffer 115 on the basis of each PVV signal is executed with different timing for each of the colors. More specifically, the yPVV signal, the mPVV signal, the cPVV signal, and the kPVV signal are turned ON at the times t10, t20, t30, and t40, respectively. Then, the yPVV signal, the mPVV signal, the cPVV signal, and the kPVV signal are turned OFF at the times t50, t60, t70, t80, respectively. The time t10, the time t20, the time t30, and the time t40 are of equal interval, and this interval corresponds to the drum distance of the photosensitive drums adjacent to each other.

If the setting is changed while the Front processing of the print ASIC is operating (in the ON period of the WVV signal), the image that is being output is affected. For this reason, the parameter setting processing serving as a preparation for a subsequent page of the Front processing is performed in the period when the WVV signal is in the OFF state. The Rear processing is likewise performed. The parameter setting processing serving as a preparation for a subsequent page with regard to the Rear processing is performed in the period when the yPVV signal to the kPVV signal in the colors are in the OFF state.

Next, stack situation of image data at each point in time will be explained with reference to FIG. 6A and FIG. 6B. At the time t10, the WVV signal is already in the ON state, and accordingly, the Front processing is executed on the image data in the colors in such a manner that the Front processing is executed for all of the colors at a time for each line, and the image data in the colors respectively corresponding to the buffers 1151 to 1154 are stored to the buffers 1151 to 1154. At this point in time, the yPVV signal for the color Y has just been turned ON, and the image data has not yet been read out from the buffer 1151. Therefore, the amounts of data (the numbers of lines) of the image data stacked in the buffers 1151 to 1154 are the same.

At the time t20, the image data for the number of lines corresponding to the number of pulses of the IND signals received in the period from the time t10 to the time t20, further from the time t10, are transferred from the page memory 114 to the buffers 1151 to 1154. However, in the buffer 1151, the image data for the same number of lines has already been output. More specifically, the image data is read out from the buffer 1151, processed in the Rear processing, and transmitted to the LD of the writing unit 1211.

The image data corresponding to the lines that has been output is erased when the image data is read out from each of the buffers 1151 to 1154

This is also the same between the time t30 and the time t80. In the period when the WVV signal is in the ON state, the Font processing is executed on the image data for all of the colors at a time in order from the line at the head of the image data in accordance with the IND signals, and the image data are stored to the buffers 1151 to 1154. In the period from when the PVV signals in the colors are turned ON to when the PVV signals in the colors are turned OFF, the image data are read out from the buffers 1151 to 1154 in order from the line at the head of the image data in accordance with the IND signals, and the Rear processing is executed on the image data, and the image data are transmitted to the LDs of the writing units 1211 to 1214. For example, at the time t80, all the image data for the first page has already been transmitted to the LDs, and some of the image data in the colors Y, M, and C for the second page has already been transmitted to the LDs.

Next, operation of the print ASIC 202 performed on the IND signal (corresponding to the IND signal 2) will be explained with reference to FIG. 7. FIG. 7 shows the operation that is performed in a case where the WVV signal and the PVV signal pulse in the ON state. Upon receiving a pulse of the IND signal, the print ASIC 202 executes, on image data for a single line, the Front processing with the Front circuit, which serves as the image processing operation, and executes the transfer processing to the buffer 115. After the image processing performed on the pixels in a single line is finished, the processing is stopped. Then, upon receiving a subsequent pulse, the Front processing is executed on the pixels in a subsequent line. The Rear processing with the Rear circuit is likewise performed. Upon receiving a pulse, delay processing for required pixels is performed in accordance with the setting value of the deviation adjustment, and then, the image data for a single like is transmitted to the LD in the image processing operation period.

(Image Output Processing in a Case Where Image Interval is Reduced with Continuous Sheet (Comparative Example))

Figure 8:
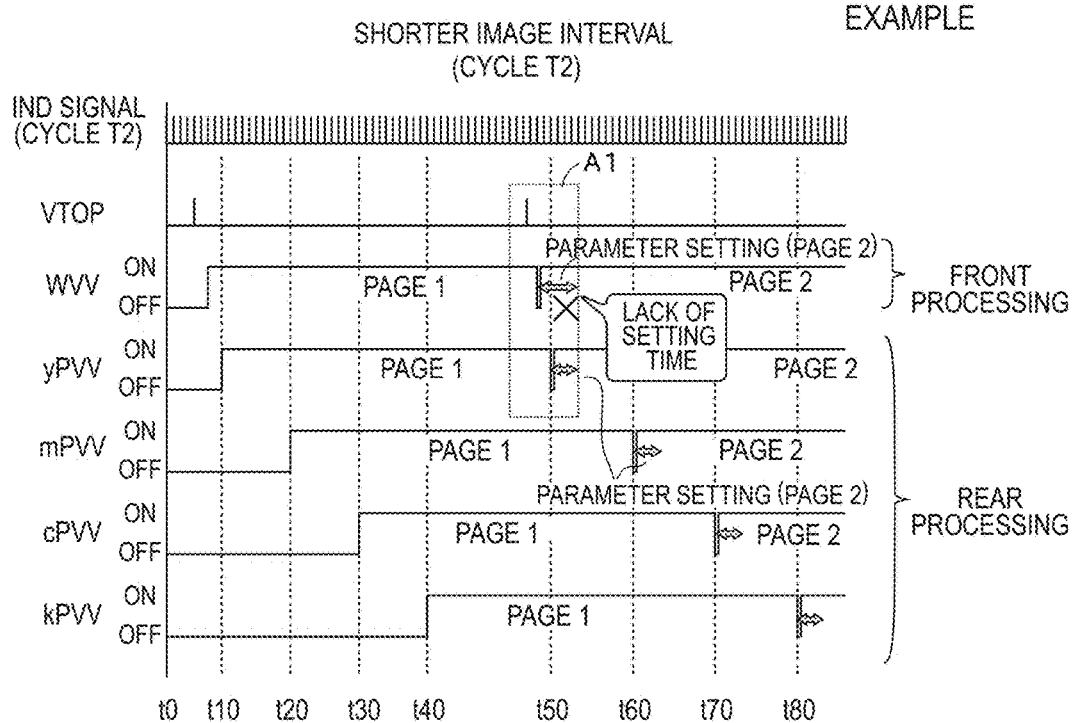
FIG. 8 is a timing chart during image output in a case where an image interval is reduced to 1 mm according to a comparative example.
Figure 9:
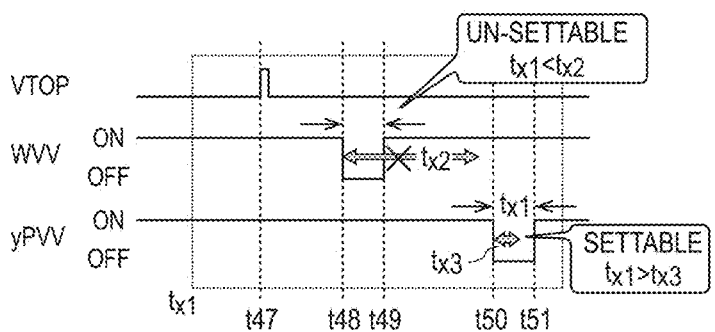
FIG. 9 is an enlarged view illustrating an A1 area of FIG. 8.

FIG. 8 and FIG. 9 are timing charts during image output in a case where a roll sheet is used as a comparative example, and if the image interval is reduced to 1 mm. FIG. 9 is an enlarged view illustrating an A1 area of FIG. 8. FIG. 8 is a figure corresponding to FIG. 4, and as compared with FIG. 4, the interval of VTOP is shorter in accordance with a shorter image interval. Therefore, the period in which the WVV signal and the PVV signal are in the OFF state is extremely short.

As shown in FIG. 9, the WVV signal is in the OFF state between the time t48 and the time t49, and the length thereof is a period tx1. Likewise, the yPVV signal is in the OFF state between the time t50 and the time t51, and the length thereof is the period tx1, too. The period tx1 corresponds to an image interval of 1 mm, and the period tx1 is about 3 msec in the case of an image forming apparatus having a process speed of 315 mm/sec.

As described above, in the parameter setting related to the Front processing, setting data having a size of about several hundred kilobytes is required to be written to the RAM area in the print ASIC 202 for each page, and the period tx2 required for the parameter setting processing is about 10 msec. More specifically, a relationship of period tx1<tx2 is satisfied, and in the period when the WVV signal is in the OFF state, the parameter setting processing for a subsequent page cannot be executed.

The setting data of the parameter setting related to the Rear processing has a size of about several dozen bytes. Therefore, the period tx3 required for the parameter setting processing is short. The period tx1 is larger than the period tx3, and parameter setting processing for a subsequent page can be executed in the OFF period of the PVV signal.

The following function reduction and circuit performance improvement methods maybe employed as means for shortening the period tx2 related to the Front processing. For example, the size itself of the setting data is reduced by decreasing some of the functions such as the stamp function explained above in order to reduce the size of the setting data written to the RAM area during the parameter setting processing. In the setting data, an image quality parameter (look up table) is prohibited from being updated between pages, and the setting data written between pages is limited. Alternatively, the processing speed is increased by improving the circuit performance (CPU speed) constituting the print ASIC 202. However, the function reduction is not a fundamental solution, and the circuit performance improvement has limitation.

(Image Output Processing in a Case Where Image Interval is Reduced with Continuous Sheet (Embodiment))

Hereinafter, an image forming apparatus capable of achieving the proper parameter setting without reducing the function even with a short image interval by adding not only the IND signal 2 used commonly with also the writing unit but also the IND signal 1 having a shorter cycle than the IND signal 2 will be explained.

Figure 10:
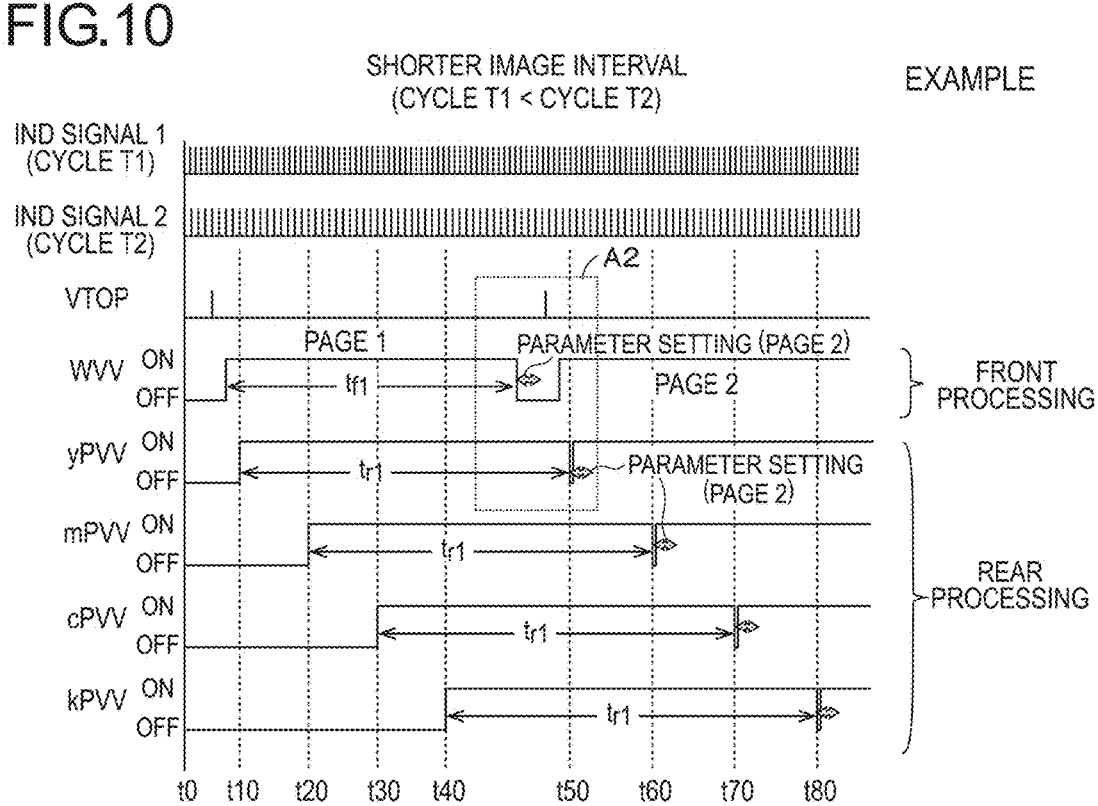
FIG. 10 is a timing chart during image output in a case where an image interval is reduced to 1 mm according to an embodiment.
Figure 11:
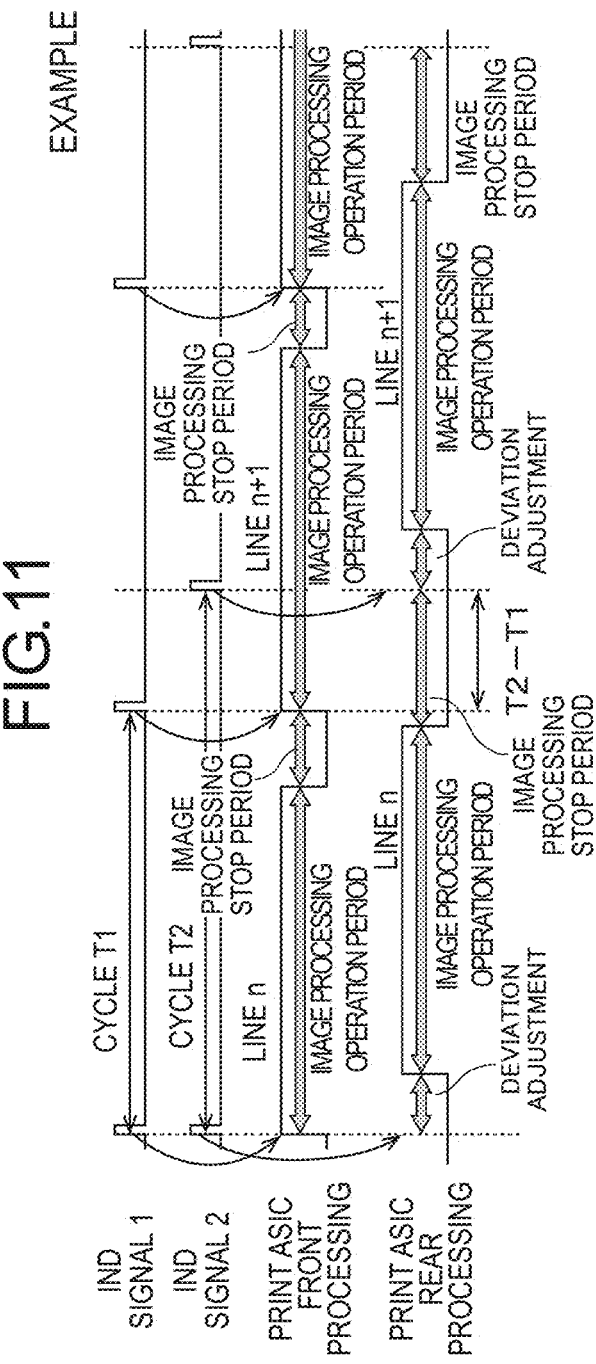
FIG. 11 is a figure for explaining operation of the print ASIC 202 in response to IND signals 1 and 2.
Figure 12:
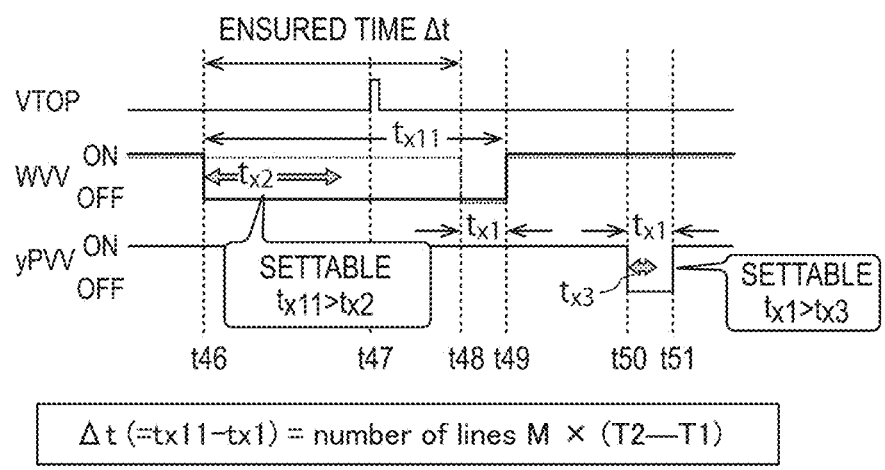
FIG. 12 is an enlarged view illustrating an A2 area of FIG. 10.

FIG. 10 to FIG. 12 are timing charts during image output in a case where a roll sheet is used as an embodiment of the invention of the present application, and the image interval is reduced to 1 mm. FIG. 11 is a figure for explaining operation of the print ASIC 202 in response to the IND signals 1 and 2. FIG. 12 is an enlarged view illustrating an A2 area of FIG. 10. FIG. 10 to FIG. 12 are figures corresponding to FIG. 8, FIG. 7, and FIG. 9, respectively. It should be noted that the IND signal 2 corresponds to the IND signal in the comparative example as shown in FIG. 4 and FIG. 8.

As shown in FIG. 10 and FIG. 11, the cycle T1 of the IND signal 1 used for the Front processing is shorter than the cycle T2 of the IND signal 2 used for the Rear processing. Therefore, the transfer speed of the image data from the page memory 114 to the buffer 115 that is performed on the basis of the IND signal 1 when the WVV signal is in the ON state (first speed) is faster than the speed for reading the image data from each of the buffers 1151 to 1154 that is performed on the basis of the IND signal 2 when the PVV signal is in the ON state (second speed).

Since the cycle T1 is shorter than the cycle T2, the image processing stop period is shorter in the Front processing than in the Rear processing (see FIG. 11). Therefore, every time the image data for a single line is processed upon receiving a single pulse of the IND signal, the processing is finished earlier by a difference of the cycles (T2−T1) (see FIG. 11). More specifically, where the number of lines of the image data to be printed is denoted as M, the WVV signal is turned off at a point in time earlier by a time obtained by multiplying the number of lines M by the difference (M×(T2−T1)). The time t46 at which the WVV signal is turned OFF as shown in FIG. 12 is earlier than the time t48 at which the WVV signal is turned OFF according to the comparative example of FIG. 9. Where the time thus ensured is denoted as Δt, this can be described as Δt=M×(T2−T1). In the drawing, the WVV signal according to the comparative example of FIG. 9 is denoted as a broken line.

As described above, when the cycle T1 of the IND signal 1 is configured to be shorter than the cycle of the IND signal 2, the transfer processing of the image data of the previous page to the buffer 115 can be finished earlier, and in addition, the OFF period tx11 of the WVV signal can be configured to be longer than the period tx2 required for the parameter setting processing. Therefore, even in a case where the image interval tx1 is reduced, the parameter setting processing on the image data of the subsequent page can be executed between images.

(Upper Limit Value of Cycle T1 (Lower Limit Value of Transfer Speed))

In this case, the upper limit value of the cycle T1 of the IND signal 1 (transfer speed is slow) will be explained. The following expression holds: OFF period tx11 of the WVV signal =ensured time Δt+image interval tx1=M×(T2−T1)+tx1. This OFF period tx11 has only to be longer than the period tx2. More specifically, where the number of lines of the smallest image whose image data length in the sub-scanning direction is the shortest, which can be received by the image forming apparatus 10, is denoted as Mmin, the cycle T1 is set so as to satisfy the following expression (1).

$$tx11 = Mmin \times (T2-T1) + tx1 \geq tx2 \quad (1)$$

(Effects)

In general, the control of the Front processing and the Rear processing is executed on the basis of the common IND signal as shown in the comparative example. The control of the Rear processing is required to be the same as and synchronized with the rotation cycle of the polygon mirror, but such limitation is not applicable to the control of the Front processing. The present invention focuses on this point, and the Front processing purposely uses a signal different from the IND signal of the Rear processing.

The image forming apparatus 100 includes a both-sided conveying path, not shown, and images can be formed on both sides of another cut sheet by replacing the sheet feeding apparatus 200 and the like with a sheet feeding apparatus supporting the another cut sheet. In a case where images are formed on both sides by using a cut sheet, the vertical multiplications are shifted on the back surface with respect to the front surface for reasons such that the shrinkage ratio during sheet heating by the fixing apparatus is different. The IND signal generation circuit 190 uses the image on the back surface formed when images are formed on both sides in order to finely adjust the vertical multiplication during forming (the line interval in the sub-scanning direction). Therefore, the IND signal generation circuit 190 generates an IND signal of a cycle different from that of the front surface. In the present embodiment, the IND signal for the back surface thereof is used as the IND signal 1 for the Front processing.

As described above, in the present embodiment, image processing is performed on image data in units of pages stored in the page memory on the basis of parameter setting, and the image data is transferred to the buffer at a first speed, and the image data having been read out from the buffer at a second speed is transmitted to the image forming unit, and parameter setting is executed for image processing that is performed when image data for a subsequent page is transferred after image data for a single page has been transferred but before the image data for the subsequent page is started to be transferred. The cycle T1 of the IND signal 1 is set to be shorter than the cycle T2 of the IND signal 2 so that the first speed is faster than the second speed.

By doing so, even when the image interval is set to be shorter, the period (tx11 of FIG. 12) from when the transfer of the image data for the single page is finished to when the transfer of the image data for the subsequent page is started can be configured to be sufficiently longer than the period (tx2) required for the parameter setting processing. Therefore, without forcing a reduction in the functions or excessive improvement of the circuit performance, the parameter setting for the original functions can be done between images.

Another Embodiment

Since the ensured time Δt can be increased by setting the cycle T1 to be shorter, the image interval can be further narrowed, and an image having a short length in the sub-scanning direction can be supported. However, when the cycle T1 is reduced, the transfer speed to the buffer 115 becomes faster, which temporarily increases the amount of data stacked in the buffer 115, and depending on the situation, the buffer 115 becomes full, and the buffer 115 can no longer store any more data. In the another embodiment explained below, the cycle T1 is determined in view of the remaining capacity of the buffer 115.

(Lower Limit Value of Cycle T1 (Upper Limit Value of Transfer Speed))

Figure 13B:
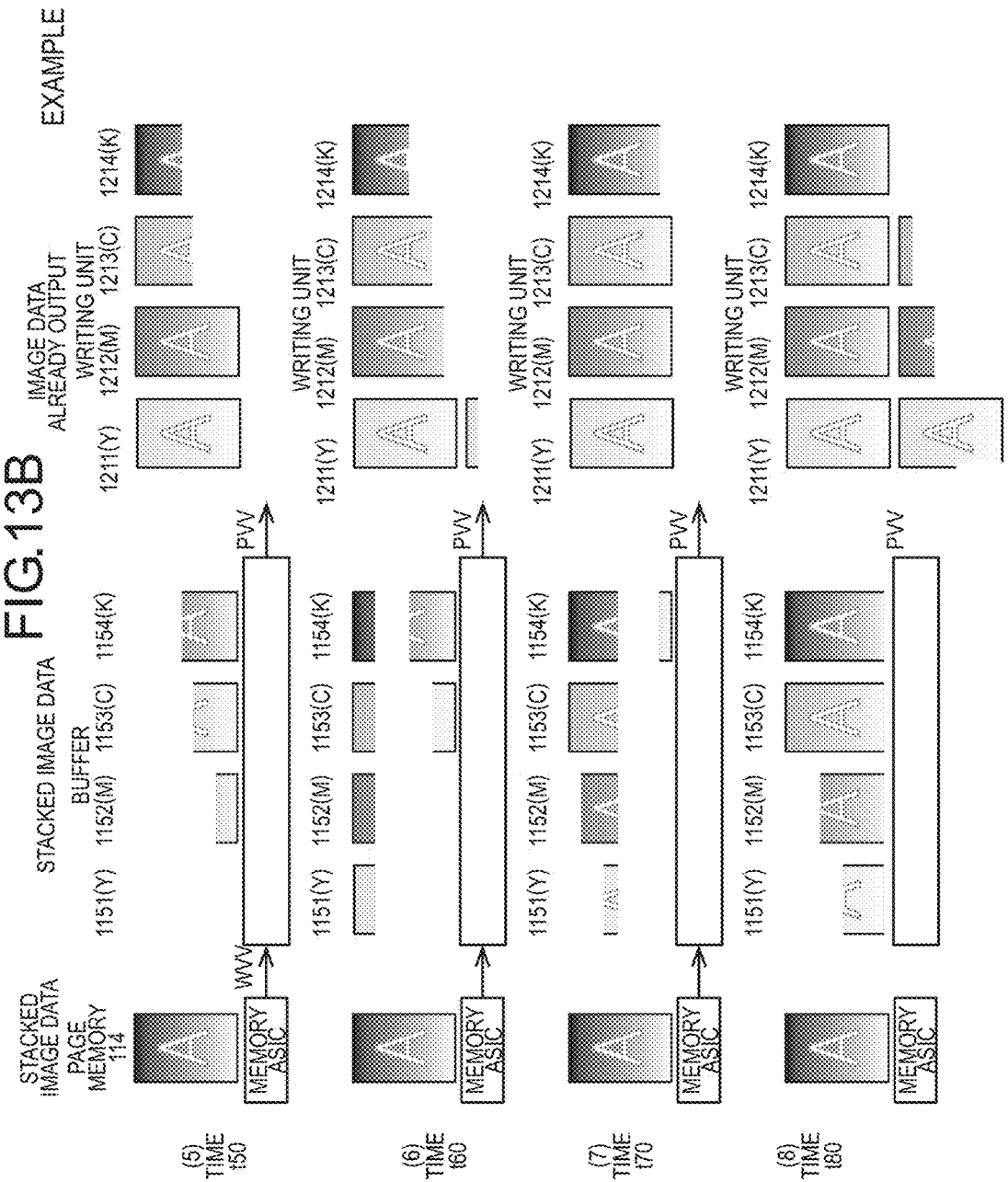
FIG. 13B is a schematic diagram illustrating accumulation situation of image data in the page memory 114 and the buffer 115 at times t50 to t80 of FIG. 10.

FIG. 13A and FIG. 13B are schematic diagrams illustrating stack situation of image data in the page memory 114 and the buffer 115 at times t10 to t80 of FIG. 10. FIG. 13A and FIG. 13B correspond to FIG. 6A and FIG. 6B, respectively. In the comparative example as shown in FIG. 6A and FIG. 6B, the speed for transferring image data from the page memory 114 to the buffer 115 and the speed for reading out the image data from the buffer 115 and transmitting the image data to the LD are the same. On the other hand, in the embodiment as shown in FIG. 13A and FIG. 13B, the speed for transferring the image data to the buffer 115 (first speed) is faster than the speed for reading out the image data from the buffer 115 and transmitting the image data to the LD (second speed).

Therefore, in the embodiment, as compared with the comparative example, the amount of data stacked in the buffer 115 is relatively higher. The lower limit value of the cycle T1 (the upper limit value of the first speed) is defined by the remaining capacity of the buffer 115 when image data is stacked in the buffer 115. This will be hereinafter explained.

Figure 14:
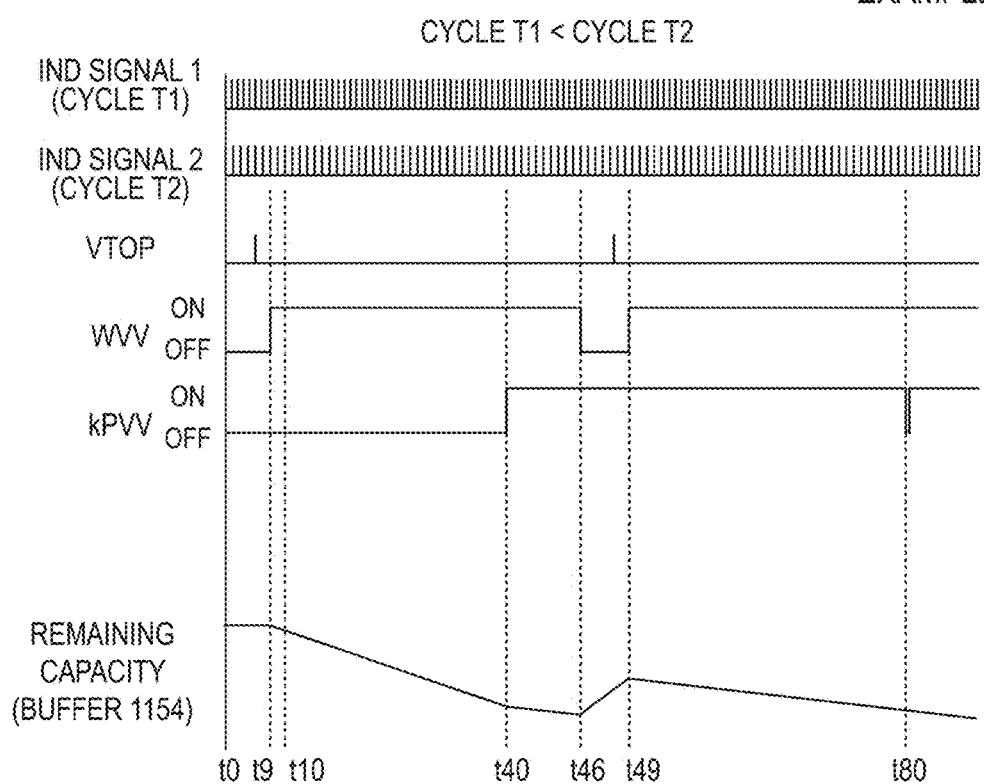
FIG. 14 is a figure for explaining transition of the remaining capacity of a buffer 1154 for color K.

FIG. 14 is a figure for explaining transition of the remaining capacity of the buffer 115<sub>4</sub> for the color K. In a case where the image forming apparatus using the intermediate transfer belt 123 and arranged with writing units and photosensitive drums in the order of Y, M, C, and K from the upstream side as shown in FIG. 1, the buffer 115<sub>4</sub> for the color K at the most downstream side has the highest amount of stacked image data as is evident from FIG. 13A and FIG. 13B. More specifically, under a condition that the buffer capacity of each color is the same, the remaining capacity of the buffer 115<sub>4</sub> corresponding to the color arranged at the most downstream side is the least.

In the case of an image forming apparatus of a method for successively transferring toner images formed on the photosensitive drums onto a sheet conveyed on a transfer belt in an overlapping manner without using any intermediate transfer belt, the order in which the writing units and the photosensitive drums in the colors are arranged is in the order opposite to FIG. 1. More specifically, from the view point of the color reproduction of the toners on the sheet S, the writing units and the photosensitive drums in the colors are arranged in the order of K, C, M, and Y from the upstream side. In this case, the buffer for the color Y arranged at the most downstream side has the highest amount of stacked image data.

As shown in FIG. 14, from the time t9 at which the WVV signal is switched ON, the transfer of the image data to the buffer 1154 is started. In the periods in which the WVV signal is in the ON state, i.e., from times t9 to t46, and after the time t49, the image data is transferred to the buffer 1154 at a constant speed according to the cycle T1, and the image data is stacked. In a period of time before the time t40 in the period from the time t9 to the time t46, the image data is not read out and simply stacked, and therefore, the remaining capacity of the buffer 1154 decreases at a constant speed.

The image data is started to be read out from the buffer 1154 from the time t40 at which the kPVV signal is switched ON. In the period in which the kPVV signal is in the ON state (from the time t40 to the time t80), the image data is read out from the buffer 1154 at a constant speed according to the cycle T2, and accordingly, the amount of stacked image data decreases, and the remaining capacity of the buffer 1154 increases.

Since the cycle T1 is set to be shorter than the cycle T2, the transfer speed for transferring the image data to the buffer 1154 is faster than the read out speed. Therefore, in the period in which the transfer and the read out are performed at a time (times t40 to t46), the gradient becomes gentler than before that period, but the remaining capacity continues to decrease little by little. On the other hand, in the period in which only the read out is performed (times t46 to t49), the remaining capacity increases. Because of this, the remaining capacity of the buffer 1154 decreases most greatly at the point in time when the WVV signal is turned OFF (time t46). The lower limit value of the cycle T1 of the IND signal 1 may be set so that the buffer remaining capacity becomes equal to or more than zero at the point in time when the WVV signal attains the OFF state.

The lower limit value of the cycle T1 of the IND signal 1 (the upper limit value of the transfer speed) is determined from the ratio with the IND signal 2 (a ratio with the read out speed), the sub-scanning length of the image, the drum distance, and the capacity of the buffer 115.

Figure 15:
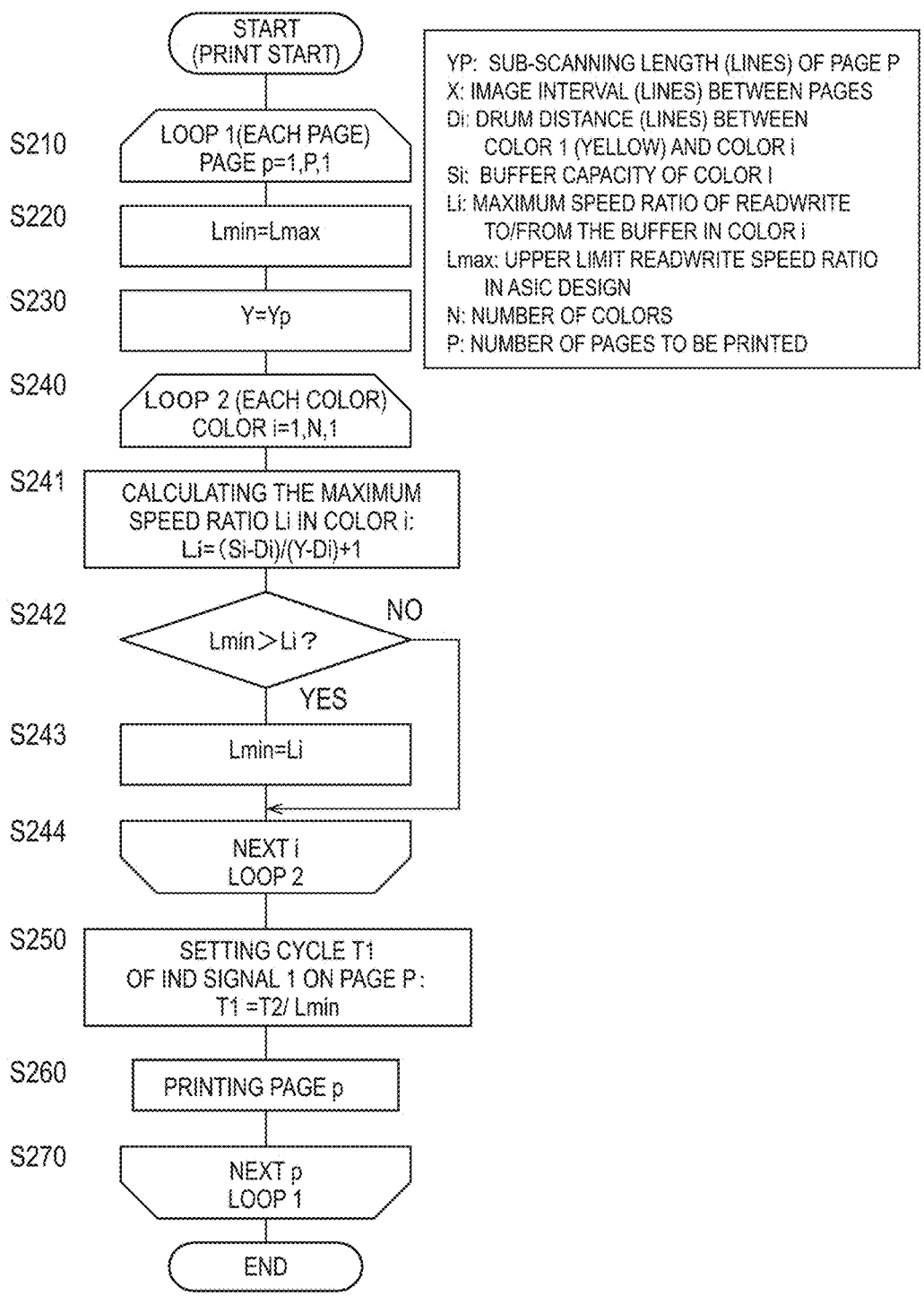
FIG. 15 is a flowchart for determining a transfer speed (first speed).

FIG. 15 is a flowchart for determining the transfer speed (first speed) executed by the control unit 110. A setting procedure of the cycle T1 will be explained with reference to FIG. 15. In the following explanation, in order to simplify the calculation, the unit is not defined by a length (millimeters) and instead the unit is defined by the number of lines (lines). The buffer capacity is also defined by the number of lines (lines) in a case where the buffer stores image data having the maximum width in which the amount of data is the largest per line. The definition of each variable is as shown below.

Yp: sub-scanning length (lines) of an image on a page p
X: image interval (lines) between pages
Di: drum distance (lines) between color 1 (color at upstream side (color Y in FIG. 1)) and color i
Si: buffer capacity of color i
Li: maximum speed ratio of ReadWrite to/from the buffer in color i (=Vw/Vr=T2/T1)
Lmax: upper limit ReadWrite speed ratio in ASIC design
N: the number of colors ("4" in the example of FIG. 1)
P: the number of pages to be printed In steps S210 to S270 of FIG. 15, the processing of loop 1 is performed. In step S210, the variable p is set to an initial value 1, and thereafter, the processing in the loop is repeated up to the print page number P of the final value.

Within the loop 1, first, a variable Lmin is set to Lmax, a variable Y is set to the length Yp of the image data on page p (S220, S230).

Subsequently, in steps S240 to S244, the processing in the loop 2 is performed. In step S240, the variable i in the color is set to an initial value 1, and thereafter, the processing in the loop is repeated up to N of the final value. Numerals 1, 2, 3, and 4 of i indicate the order of arrangement of colors, and in the example as shown in FIG. 1, numerals 1, 2, 3, and 4 correspond to Y, M, C, and K, respectively, which are in order from the color at the upstream side. It should be noted that N is not limited to four. N is "1" in a case of an image forming apparatus of a single color, and N is "6" in a case of an apparatus having image forming units in six colors.

In step S241, the maximum speed ratio Li in the color i is calculated from the following expression (2).

$$Li=(Si-Di)/(Y-Di)+1 \qquad (2)$$

Then, the calculated Li is compared with Lmin that is set in step S220, and when the condition of step S242 (Lmin>Li) is satisfied (YES), Lmin is set to Li (S243).

As described above, the maximum speed ratio of the transfer speed is calculated for each color, and by processing the loop 2, the smallest value of the maximum speed ratio of each color is set to Lmin.

By using this Lmin, the cycle T1 of the IND signal 1 on page p is determined from the following expression (3) by using the cycle T2 of the IND signal 2 (S250).

$$\text{cycle } T1 = \text{cycle } T2/Lmin \qquad (3)$$

Then, when it is a point in time to print image data on page p, the control unit 110 controls the IND signal generation circuit 190 to apply the cycle T1 determined in step S250 (commonly to all the colors). Then, the image control circuit 113 is controlled so as to execute the Front processing with the applied cycle T1 and the Rear processing with the predetermined cycle T2, and the page p is caused to be printed with the image forming unit 120 (S260). Then, this is repeated up to the final page P (loop 1).

Hereinafter, a flowchart of FIG. 15, and more particularly, calculation in S241 will be additionally explained in accordance with a specific example. For example, when the color is K and i is "4", the capacity of the buffer 1154 consumed until the point in time when kPVV is switched ON (time t40 in FIG. 14) is defined by the drum distance Di between Y and K. In this case, D is the drum distance between adjacent photosensitive drums, and the drum distance Di between Y and K is 3D which is three times the drum distance D. Therefore, when the capacity of the buffer 1154 is denoted as S, the remaining capacity of the buffer 1154 at the point in time when kPVV is switched ON is S−3D.

In contrast to the remaining capacity (S−3D), the remaining image data (Y−3D) that has not yet stored to the buffer increases in the buffer 1154 with the rate of the speed difference ΔL. Therefore, in a case where the expression of S−3D=(Y−3D)××L is satisfied, the remaining capacity of the buffer 1154 becomes exactly zero when the remaining capacity decreases to the least level. As a result, ΔL=(S−3D)/(Y−3D) is obtained. It should be noted that Y in the expression used here is the sub-scanning length of the image data on the page p (see step S230).

For example, where S=16384, 3D=6732, and Y=28228 (all of which are in units of Lines), then ΔL is 0.44. In this case, the maximum speed ratio Li of the speed (write speed) Vw for transferring image data to the buffer 1154 with respect to the reading speed Vr is ΔL+1=1.44. More specifically, Vw (first speed) maybe 1.44 times faster than Vr (second speed). The cycle is a reciprocal number thereof. Therefore, the cycle T1 may be set to 0.694 times the cycle T2. In this case, as compares with the PVV signal, the ON period of the WVV signal is about 70%. Therefore, the remaining period of about 30% can be allocated to the parameter setting processing that is applied to image data for a subsequent page.

(Additional Processing)

Figure 16:
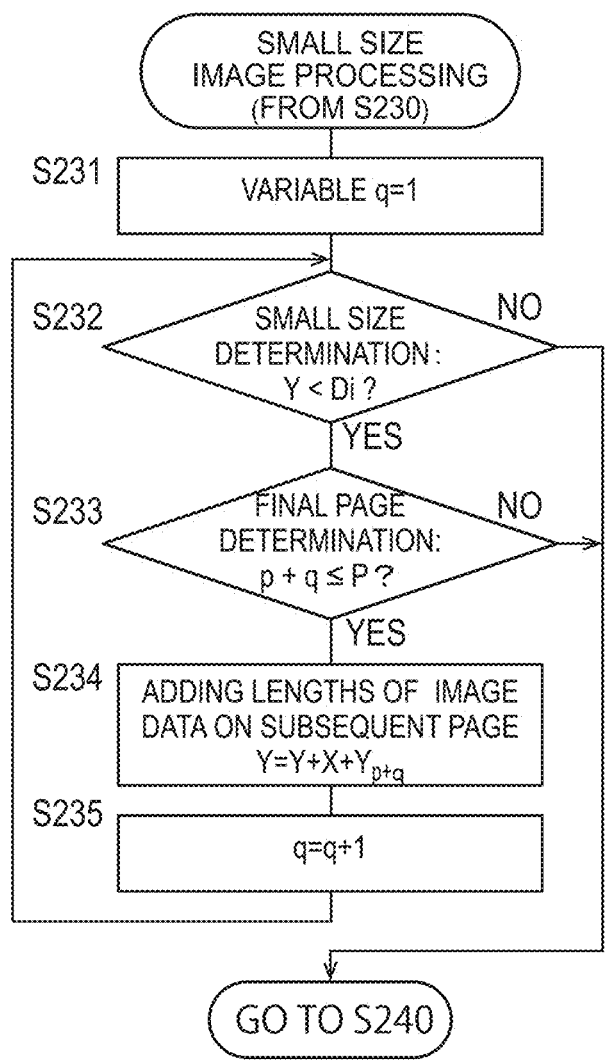
FIG. 16 is a flowchart about additional processing of FIG. 15.

FIG. 16 is a flowchart related to additional processing of FIG. 15. In the flowchart of FIG. 15, in a case where the length Y of the image data in the sub-scanning direction is shorter than the drum distance Di (for example, 3D=270 to 360 mm), the image data for the subsequent page is started to be written (transferred) to the buffer 115 before the image data is started to be read out from the buffer 115. In the flowchart of FIG. 15, the processing in that case is omitted. In the flowchart as shown in FIG. 16, such a case is taken into consideration.

The flowchart of FIG. 16 is subsequent to S230 of FIG. 15. First, in step S231, the variable q is set to an initial value 1. Subsequently, in S232, a determination is made as to whether Y, which is the length of the image data in the sub-scanning direction, is less than the drum distance Di or not. When Y is determined to be less than the drum distance Di, the lengths of the image data on subsequent pages are added until the total value of the lengths of the image data in the sub-scanning direction ($Y=Y+X+Y_{p+q}$) becomes more than the drum distance Di. Then, the processing in S240 and subsequent steps of FIG. 15 is performed by using this summation value. However, if any subsequent page does not exist (S233: NO), all of the image data can be stored to the buffer 115. Therefore, the transfer speed to the buffer 115 may be simply set to the maximum speed.

As described above, in another embodiment, the image processing with the image control circuit 113 is executed by using the transfer speed calculated in the control of FIG. 15 and FIG. 16. Therefore, this prevents the subsequent processing from being inexecutable because of the shortage in the remaining capacity of the buffer 115 during the transfer, and the parameter setting for the original functions can be done without forcing a reduction in the functions or excessive improvement of the circuit performance.

Modification

Figure 17:
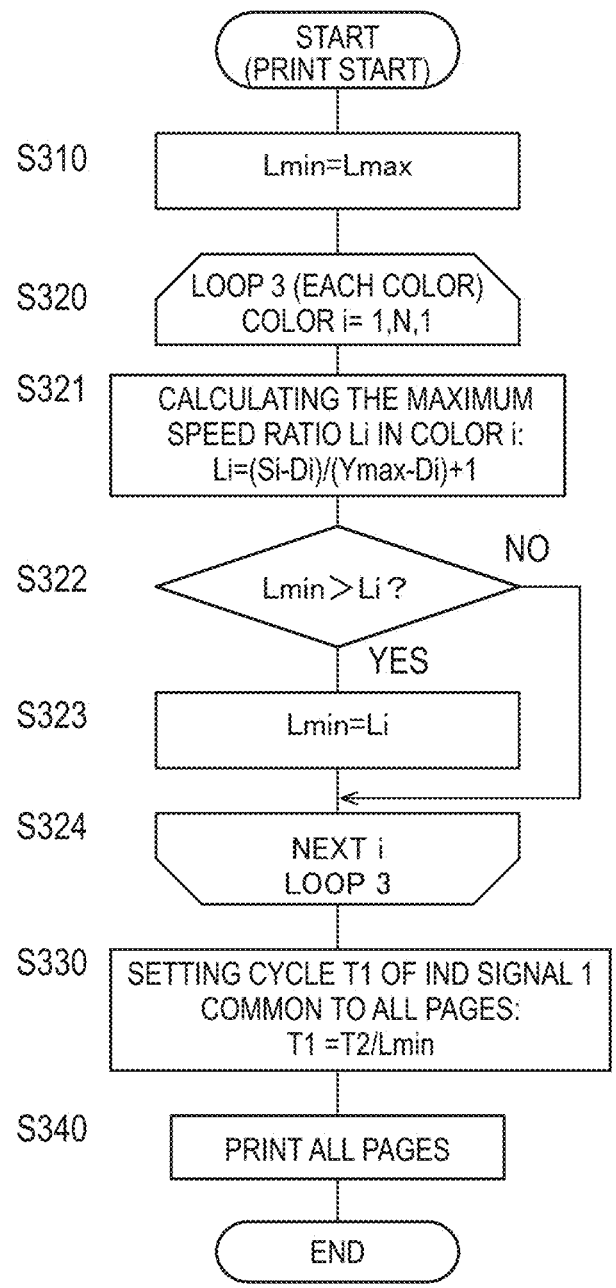
FIG. 17 is a flowchart for determining a transfer speed (first speed) according to a modification.

FIG. 17 is a flowchart for explaining a procedure for determining the transfer speed (first speed) according to the modification. In the control flow explained in the flowchart of FIG. 15, the transfer speed is determined by using the length Yp of the image on each page. The modification of FIG. 17 is different therefrom. In the modification of FIG. 17, the transfer speed is determined by using a fixed length of an image, and this is commonly applied to all the pages. The length of the image used at this occasion uses a length Ymax in the sub-scanning direction of an image having a maximum image size in design that can be processed by the image control circuit 113. The maximum image size in design depends on the capacity of the page memory (for example, several gigabytes), and is a maximum image size that can be extracted to this page memory.

The flowchart of FIG. 17 corresponds to the flowchart of FIG. 15. The difference from the flowchart of FIG. 15 resides in step S321. In step S321, the maximum speed ratio Li is calculated from the following expression (4) by using Ymax.

$$Li=(Si-Di)/(Ymax-Di)+1 \quad (4)$$

By performing the processing of the loop 3 in steps S320 to S324, the least value of the maximum speed ratios of the colors is set to Lmin.

Then, by using Lmin that has been set, the cycle T1 of the IND signal 1 common to all the pages is set (S330). Thereafter, when it is a time to print image data on a page p, the control unit 110 controls the IND signal generation circuit 190 and the image control circuit 113 so as to execute the image processing (see FIG. 3) by applying the cycle T1 determined in step S330, and causes the image forming unit 120 to print all the pages (S340).

In the control flow explained in FIG. 17, the processing in S310 to S330 need not be performed every time printing is executed, and the cycle T1 of the IND signal 1 determined based on the flowchart of the drawing is stored to the control memory 112 and the like in advance, and the cycle T1 of the IND signal 1 maybe readout on every printing. Instead of causing the control unit 110 to perform the processing in S310 to S330 on its own, a designer may theoretically calculate the cycle T1, and the calculated cycle T1 may be stored to the control memory 112 and the like, and by using the cycle T1, the control unit 110 may execute the processing in S340.

By doing so, in the modification, the same effects as those of the another embodiment can be obtained, and in addition, the cycle T1 is calculated and applied to each page printed.

Other Modifications

The another embodiment and the modification shown in FIG. 15 to FIG. 17, the transfer speed (first speed) to the buffer 115 is set to the maximum level as long as the remaining capacity of the buffer 115 during transfer does not become insufficient. When the transfer speed is increased, the WVV signal is turned OFF in a short period of time. Therefore, it is possible to ensure a longer time to execute the parameter setting processing for a subsequent page. However, as long as the above expression (1) is satisfied, the transfer speed may not be necessarily maximized.

For example, the transfer speed may be set in a range between the maximum transfer speed of each page p determined in the control as shown in FIG. 15 and the minimum transfer speed (the cycle T1 is the largest) satisfying the following expression (5) obtained by deforming the above expression (1).

$$Mp \times (T2-T1)+tx1 \geq tx2 \quad (5)$$

In this case, Mp is a length (lines) of the image data on each page p in the sub-scanning direction.

Alternatively, the transfer speed may be set in a range between the maximum transfer speed calculated from the maximum image size Ymax in design that can be processed and commonly applicable to each page, which has been determined in the control as shown in FIG. 17, and the minimum transfer speed satisfying the expression (1), and this transfer speed may be stored to the control memory 112 and the like, and the fixed transfer speed may be applied at all times.

FIG. 1 and the like show the tandem type image forming apparatus as an example, but the embodiment is not limited thereto. The embodiment may be applied to an image forming apparatus for a single color (monochrome) having a single buffer. FIG. 1 to FIG. 3 explain the example where the LD is used as the writing unit, but the embodiment is not limited thereto. Alternatively, the embodiment may also be applied to a writing unit using an LED array arranged with multiple LEDs in a single row or multiple rows.

Further, a program for operating the image forming apparatus may be provided by a computer readable recording medium such as a USB memory, a flexible disk, and a CD-ROM, or may be provided online via a network such as the Internet. In this case, the program recorded on the computer readable recording medium is usually transferred to and stored in a memory, a storage, and the like. This program may be provided, for example, as independent application software, or may be incorporated into software of the apparatus as a function of the image forming apparatus.

Further, the present invention is defined by the contents described in the claims, and various modified forms can be made.

What is claimed is:

1. An image forming apparatus for forming an image on a sheet on the basis of image data in units of pages, the image forming apparatus comprising:
    a page memory storing the image data in units of pages;
    a buffer temporarily storing the image data transferred from the page memory at a first speed;
    an image forming unit forming an image on the basis of the image data read out from the buffer at a second speed; and
    an image control circuit controlling operation of the transfer and the read out, performing parameter setting for each page, and performing image processing on the image data on the basis of the parameter setting,
    wherein the first speed is faster than the second speed, and after the image data for a single page has been transferred from the page memory to the buffer but before image data for a subsequent page is started to be transferred, the image control circuit executes the parameter setting for the image data for the subsequent page.

2. The image forming apparatus according to claim 1, wherein the transfer and the read out are performed on image data for a single main scanning line,
    the image control circuit uses first and second index signals to control operation timing of the transfer and the read out, respectively, for each main scanning line,
    the second index signal is commonly used for control of operation timing of writing of the main scanning line with a writing unit of the image forming unit, and
    a cycle of the first index signal is set to be shorter than a cycle of the second index signal, so that the first speed is configured to be faster than the second speed.

3. The image forming apparatus according to claim 1, wherein the first speed is set to such a speed that a time for executing the parameter setting can be ensured after image data for a single page has been transferred from the page memory to the buffer but before image data for a subsequent page is started to be transferred.

4. The image forming apparatus according to claim 1, wherein the image forming unit includes a plurality of writing units corresponding to a plurality of colors,
    a plurality of the buffers are provided so as to correspond to the plurality of writing units, respectively,
    the image control circuit executes image processing on image data constituted by signals of a plurality of color components stored in the page memory on the basis of the parameter setting when the image data of all the colors are transferred, at a time, to the buffers respectively corresponding to the colors.

5. The image forming apparatus according to claim 4, wherein the image control circuit performs read out of image data of pages from the plurality of buffers at operation timing which differs according to the color components.

6. The image forming apparatus according to claim 4, comprising a control unit calculating an upper limit value of the first speed for each color on the basis of an image size of image data in units of pages in a sub-scanning direction, a capacity of each of the plurality of the buffers, a relative distance between exposure positions of the plurality of writing units, the second speed, and a maximum transfer speed in design with the image control circuit,
    wherein the control unit compares the calculated upper limit value of the first speed for each color, and the control unit commonly applies the lowest first speed to all the colors, and the control unit causes the image control circuit to execute transfer of the image data of the colors from the page memory to the plurality of the buffers, respectively.

7. The image forming apparatus according to claim 6, wherein the control unit executes calculation and application of the first speed for each page.

8. The image forming apparatus according to claim 6, wherein the control unit calculates the first speed on the basis of a maximum image size in design that can be processed.

9. The image forming apparatus according to claim 4, wherein the first speed is equal to or more than a lower limit value of the first speed with which it is possible to ensure a time to execute the parameter setting after the image data for a single page has been transferred from the page memory to the buffer but before image data for a subsequent page is started to be transferred, and
    the first speed is equal to or less than an upper limit value of the first speed which is the lowest one of upper limit values of the first speed of the colors, which are calculated on the basis of a maximum image size in design that can be processed in a sub-scanning direction of the image data in units of pages, a capacity of each of the plurality of the buffers, a relative distance between exposure positions of the plurality of writing units, the second speed, and a maximum transfer speed in design with the image control circuit.

10. An image forming system comprising:
    the image forming apparatus according to claim 1; and
    a sheet feeding apparatus conveying a continuous sheet to the image forming apparatus,
    wherein the image forming unit continuously forms images in units of pages on a continuous sheet on the basis of a plurality of image data in units of pages.

11. An image processing method comprising:
    a step of storing image data in units of pages to a page memory;
    a step of performing image processing on the image data stored in the page memory on the basis of parameter setting, and transferring the image data to a buffer at a first speed;
    a step of transmitting the image data, which is read out from the buffer at a second speed, to an image forming unit; and
    a step of executing parameter setting on the image data for a subsequent page after the image data for a single page has been transferred to the buffer but before image data for the subsequent page is started to be transferred,
    wherein the first speed is faster than the second speed.

12. The image processing method according to claim 11, wherein in the step of transfer the image data and the step of reading out and transmitting the image data, first and second index signals are used to control operation timing of the transfer and the read out, respectively, for the image data in a single main scanning line, the second index signal is commonly used for control of operation timing of writing of the main scanning line with a writing unit of the image forming unit, and a cycle of the first index signal is set to be shorter than a cycle of the second index signal, so that the first speed is configured to be faster than the second speed.

13. The image processing method according to claim 11, wherein the first speed is set to a speed with which it is possible to ensure a time to execute the parameter setting after the image data for a single page has been transferred from the page memory to the buffer but before image data for a subsequent page is started to be transferred.

14. The image processing method according to claim 11, wherein the image forming unit includes a plurality of writing units corresponding to a plurality of colors, a plurality of the buffers are provided so as to correspond to the plurality of writing units, respectively, in the step of transferring the image data, the image data of all the colors constituted by signals of a plurality of color components stored in the page memory on the basis of the parameter setting are transferred, at a time, to the buffers respectively corresponding to the colors, and image processing is executed on the image data on the basis of the parameter setting.

15. The image processing method according to claim 14, further comprising:

calculating an upper limit value of the first speed for each color, which is calculated on the basis of an image size in a sub-scanning direction of the image data in units of pages, a capacity of each of the plurality of the buffers, a relative distance between exposure positions of the plurality of writing units, the second speed, and a maximum transfer speed in design with the image control circuit; and a step of comparing the upper limit value of the first speed for each color calculated in the calculating step, and commonly applying the lowest first speed to all the colors, wherein in the step of transferring the image data, the first speed applied in the applying step is used to execute transfer of the image data of the colors from the page memory to the plurality of the buffers, respectively.

16. A non-transitory computer-readable recording medium storing a program for causing an image forming apparatus to execute an image processing method, the image processing method comprising:

a step of storing image data in units of pages to a page memory;

a step of performing image processing on the image data stored in the page memory on the basis of parameter setting, and transferring the image data to a buffer at a first speed;

a step of transmitting the image data, which is read out from the buffer at a second speed, to an image forming unit; and a step of executing parameter setting on the image data for a subsequent page after the image data for a single page has been transferred to the buffer but before image data for the subsequent page is started to be transferred, wherein the first speed is faster than the second speed.

17. The non-transitory computer-readable recording medium according to claim 16, wherein in the step of transfer the image data and the step of reading out and transmitting the image data, first and second index signals are used to control operation timing of the transfer and the read out, respectively, for the image data in a single main scanning line, the second index signal is commonly used for control of operation timing of writing of the main scanning line with a writing unit of the image forming unit, and a cycle of the first index signal is set to be shorter than a cycle of the second index signal, so that the first speed is configured to be faster than the second speed.

18. The non-transitory computer-readable recording medium according to claim 16, wherein the first speed is set to a speed with which it is possible to ensure a time to execute the parameter setting after the image data for a single page has been transferred from the page memory to the buffer but before image data for a subsequent page is started to be transferred.

19. The non-transitory computer-readable recording medium according to claim 16, wherein the image forming unit includes a plurality of writing units corresponding to a plurality of colors, a plurality of the buffers are provided so as to correspond to the plurality of writing units, respectively, in the step of transferring the image data, the image data of all the colors constituted by signals of a plurality of color components stored in the page memory on the basis of the parameter setting are transferred, at a time, to the buffers respectively corresponding to the colors, and image processing is executed on the image data on the basis of the parameter setting.

20. The non-transitory computer-readable recording medium according to claim 19, further comprising:

calculating an upper limit value of the first speed for each color, which is calculated on the basis of an image size in a sub-scanning direction of the image data in units of pages, a capacity of each of the plurality of the buffers, a relative distance between exposure positions of the plurality of writing units, the second speed, and a maximum transfer speed in design with the image control circuit; and a step of comparing the upper limit value of the first speed for each color calculated in the calculating step, and commonly applying the lowest first speed to all the colors, wherein in the step of transferring the image data, the first speed applied in the applying step is used to execute transfer of the image data of the colors from the page memory to the plurality of the buffers, respectively.

* * * * *